US012763994B2

(12) United States Patent
Barik et al.

(10) Patent No.: US 12,763,994 B2
(45) Date of Patent: Oct. 13, 2026

(54) RESOURCE SCHEDULING BASED ON VIRTUAL PILOT-ASSISTED CHANNEL ESTIMATION CAPABILITY AT A USER EQUIPMENT (UE)

(71) Applicant: QUALCOMM Incorporated, San Diego, CA (US)

(72) Inventors: Somsubhra Barik, San Diego, CA (US); Jing Sun, San Diego, CA (US); Chih-Hao Liu, San Diego, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/674,687

(22) Filed: May 24, 2024

(65) Prior Publication Data

US 2025/0365178 A1 Nov. 27, 2025

(51) Int. Cl.
*H04L 25/02* (2006.01)
*H04L 1/18* (2023.01)
*H04L 5/00* (2006.01)

(52) U.S. Cl.
CPC ............ *H04L 25/0228* (2013.01); *H04L 1/18* (2013.01); *H04L 5/0051* (2013.01)

(58) Field of Classification Search
CPC ...... H04L 25/0228; H04L 1/18; H04L 5/0051
See application file for complete search history.

(56) References Cited

U.S. PATENT DOCUMENTS

2019/0222968 A1* 7/2019 Kim ........................ H04W 4/06
2021/0091881 A1* 3/2021 Gutman ................ H04L 1/0025
2021/0328850 A1 10/2021 Horn et al.
2021/0336832 A1 10/2021 Horn et al.
2024/0259236 A1* 8/2024 Penna ................. H04L 27/2601

FOREIGN PATENT DOCUMENTS

CN 103166891 A 6/2013
EP 2259517 A2 12/2010
WO 2009030157 A1 3/2009
WO WO-2020030254 A1 * 2/2020 ......... H04L 25/0236
WO WO-2023057064 A1 * 4/2023 ......... H04L 25/0232

OTHER PUBLICATIONS

International Search Report and Written Opinion issued in PCT/US2025/029059, mailed Sep. 19, 2025, EPO, 16 pages.
3GPP TS 38.213: "3rd Generation Partnership Project, Technical Specification Group Radio Access Network, NR, Physical Layer Procedures for Control (Release 18)", 3GPP TS 38.213, V18.1.0, Dec. 2023, pp. 1-300.
3GPP TS 38.214: "3rd Generation Partnership Project, Technical Specification Group Radio Access Network, NR, Physical Layer Procedures for Data (Release 18)", V18.1.0, Dec. 2023, pp. 1-290.

* cited by examiner

*Primary Examiner* — Duc C Ho
(74) *Attorney, Agent, or Firm* — Dinsmore & Shohl LLP

(57) ABSTRACT

Certain aspects of the present disclosure provide techniques for channel estimation. A method generally includes: sending an indication of a capability of the apparatus to construct, from data-carrying pilots, virtual pilots for performance of channel estimation, receiving an indication of one or more resources scheduled to carry one or more data-carrying pilots, and receiving, on the one or more resources, the one or more data-carrying pilots.

20 Claims, 17 Drawing Sheets

400
One Frame (TDD)
10 ms
subframe
slot
RB
subcarrier
OFDM symbol
DMRS $R_x$
CSI-RS 430
PDCCH
SSS
PSS
PDSCH
PBCH
20 RBs
system bandwidth RBs
SS/PBCH Block

450
SRS
DMRS R

480
PUCCH
PUSCH
SRS Comb 0
SRS Comb 1

RESOURCE SCHEDULING BASED ON VIRTUAL PILOT-ASSISTED CHANNEL ESTIMATION CAPABILITY AT A USER EQUIPMENT (UE)

INTRODUCTION

Field of the Disclosure

Aspects of the present disclosure relate to wireless communications, and more particularly, to techniques for channel estimation.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes sending an indication of a capability of the apparatus to construct, from data-carrying pilots, virtual pilots for performance of channel estimation; receiving an indication of one or more resources scheduled to carry one or more data-carrying pilots; and receiving, on the one or more resources, the one or more data-carrying pilots.

Another aspect provides a method for wireless communications by an apparatus. The method includes receiving an indication of a capability of the apparatus to construct, from data-carrying pilots, virtual pilots for performance of channel estimation; scheduling one or more resources to carry one or more data-carrying pilots; sending an indication of the one or more resources; and sending, on the one or more resources, the one or more data-carrying pilots.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
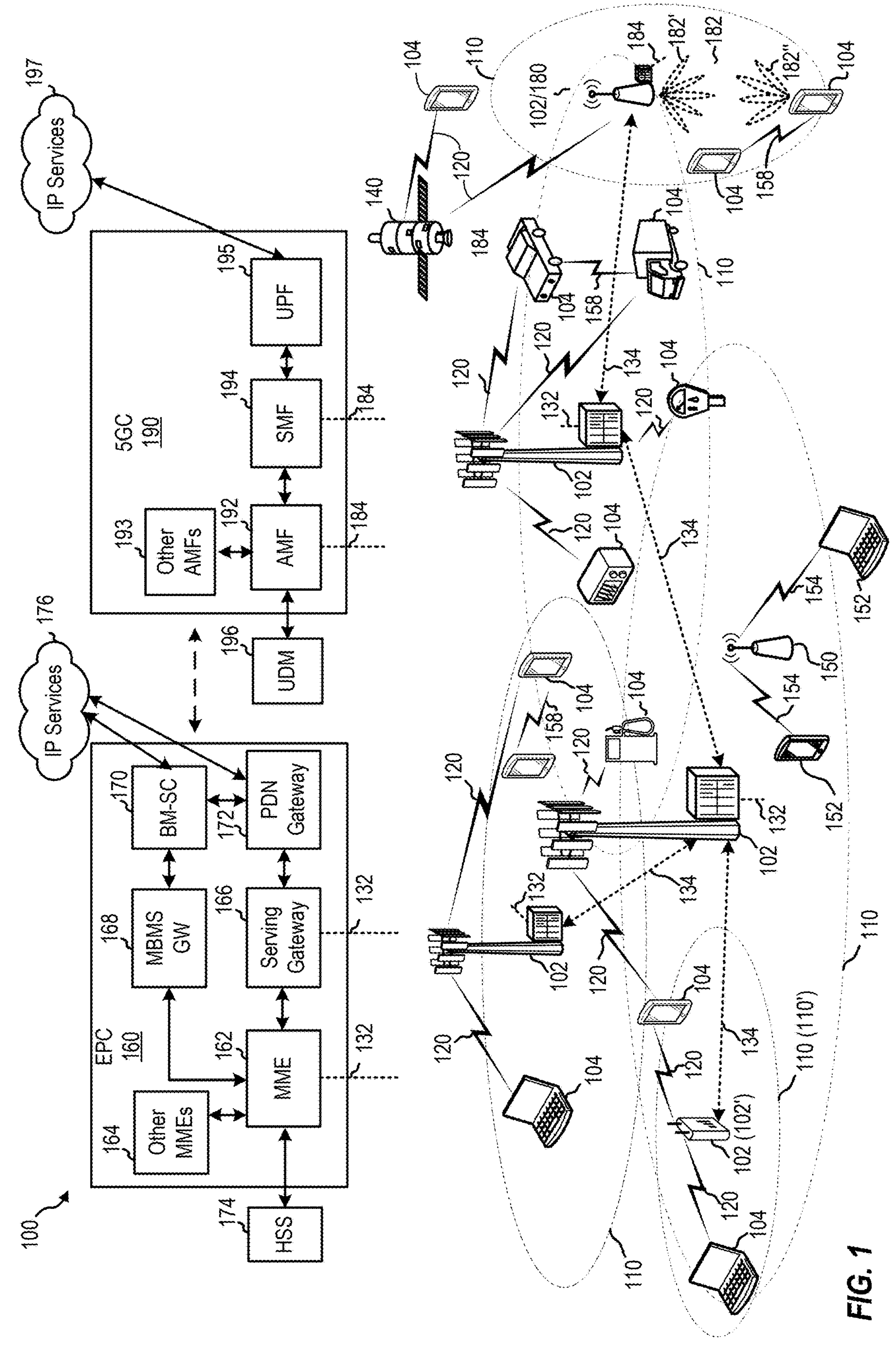
FIG. 1 depicts an example wireless communications network.

Aspects of the present disclosure relate to signaling designs used to support resource scheduling, by a network entity, for channel estimation using demodulation reference signal(s) (DMRS(s)) and/or virtual pilot(s).

In wireless communications networks, a physical downlink shared channel (PDSCH) may be used for carrying user data from a network entity (e.g., such as a base station (BS)) to a UE. To facilitate accurate demodulation and decoding of the PDSCH at the UE, DMRS(s) may be employed.

A DMRS is a special type of physical layer signal that may be transmitted on specific resource elements within downlink and/or uplink time-frequency grids. A DMRS may function as a reference signal to aid channel estimation, as well as demodulation and/or decoding of a data signal. For example, DMRS-based channel estimation is a real pilot-based approach (e.g., a method in which predefined reference signals, referred to as "real DMRS pilots," are transmitted along with data to obtain channel knowledge for proper decoding of received signals) used to estimate channel coefficients by exploiting known properties of a DMRS signal. A receiver of the DMRS may use the channel coefficients to extract information from a received data signal transmitted over the channel. For example, in the downlink, a DMRS provides a reference signal that may help a UE accurately estimate channel conditions on the PDSCH for demodulating and/or decoding a received downlink data signal. As such, the use of DMRS(s) may help contribute to the overall reliability and performance of wireless communications networks.

In some cases, each PDSCH communication may include DMRS(s) that carry information used to estimate the radio channel for demodulation and/or decoding at the UE. The PDSCH communication may further include data.

The performance of DMRS-based channel estimation may depend on the time-domain density of DMRSs scheduled in a time period (e.g., slot). Though a slot may be used as an example time period, and a symbol as a sub-time period, the techniques herein may be applicable to other suitable time periods. For example, increasing a number of DMRS symbols that are scheduled in a slot reduces the time gap between channel estimates in the slot, thereby reducing the requirement for long interpolations and/or extrapolations for channel estimation. For example, interpolation techniques may be used to determine channel estimate(s) for data symbol(s) between two DMRS symbols within a slot. Extrapolation techniques may be used to determine channel estimate(s) for data symbol(s) occurring later in time than a DMRS symbol, and not between two DMRS symbols in the slot. The reliability of interpolation and/or extrapolation techniques to estimate the channel at different symbols in a slot may be improved when the length of the interpolation and/or extrapolation is reduced (e.g., interpolation and/or extrapolation is performed over less consecutive symbols within a slot). As such, improved channel estimation accuracy for DMRS-based channel estimation may be realized, at least in part due to an increase in the number of DMRS symbols scheduled in the slot.

In some cases, however, increasing the number of DMRS symbols scheduled in a slot may not be desired and/or may not be feasible. For example, improved channel estimation performance due to the increase in the number of DMRS symbols scheduled in a slot may be realized at the expense of reduced data transmission capacity and/or increased overhead. Specifically, a slot may have a limited number of symbols where data and/or DMRSs can be scheduled. If additional DMRS symbols are scheduled in the slot, then the amount of data capable of being transmitted in the slot may be reduced. Further, overhead may be increased due to the insertion of additional non-data signaling within the slot. In some other cases, increasing the number of DMRS symbols in a slot to improve channel estimation performance may not be permitted, for example, due to at least limitations defined for some slots by wireless communications standards.

To overcome the technical challenges associated with using DMRSs for channel estimation, some techniques allow for the construction of virtual pilot(s). As used herein, a pilot refers to a known signal (e.g., its scheduled position within a slot is known to a receiver of the pilot), generally associated with a group of frequencies (e.g., subcarriers), that may be utilized for channel estimation. A virtual pilot may refer to a special type of pilot that acts as a proxy DMRS for channel estimation. For example, a virtual pilot may include information used to estimate the radio channel for demodulation and/or decoding at a UE. Virtual pilots may be constructed at various frequencies (e.g., subcarriers) (e.g., frequencies that are similar or different to frequencies associated with real pilot(s)), in one or more symbols in a slot to improve channel estimation accuracy without increasing the time-domain DMRS density for the slot. For example, a virtual pilot may be used in place of (e.g., act as a proxy for) a DMRS (e.g., a real pilot), transmitted by a network entity for channel estimation at a UE, to help perform channel estimation, while adhering to time-domain DMRS density limitations in certain slots. Further, in some cases, a similar channel estimation performance may be achieved when using a virtual pilot, instead of a real pilot, without the cost of reduced data transmission capacity.

A virtual pilot may be constructed in a slot based on data-carrying pilots scheduled in the slot. For example, a network entity may schedule data-carrying pilots in one or more symbols in a slot and send these data-carrying pilots to a UE for channel estimation. The UE may demodulate the data-carrying pilots to construct virtual pilots at the symbol location(s) (e.g., construct "virtual pilot symbol(s)") and use the virtual pilots to estimate the channel at the symbol location(s) where the virtual pilots are positioned in the slot. As the data-carrying pilots still carry data for the UE (e.g., a payload), use of data-carrying pilots may allow more data to be carried, unlike use of a DMRS that cannot be used to carry data.

A network entity may need to be aware of a UE's capability to construct virtual pilots for channel estimation before data-carrying pilots can be scheduled. Thus, to realize the advantages of using virtual pilot-based channel estimation, it may be important for a UE to inform the network entity about its capability to construct virtual pilots, from data-carrying pilots, for the performance of channel estimation.

Certain aspects described herein provide signaling designs used to support resource scheduling, by a network entity, for channel estimation using DMRS(s) and/or virtual pilot(s). The signaling described herein may allow a UE to inform a network entity about its capability to construct virtual pilots for improved channel estimation performance. In certain aspects, the capability information reported to a network entity may aid the network entity in determining when to schedule DMRS(s) and/or schedule data-carrying pilot(s) for channel estimation, for example, such that sufficient system performance, such as with respect to channel estimation performance, communication reliability, throughput, and/or overhead, is achieved.

In certain aspects, the capability information may help a network entity determine when data-carrying pilot(s) should be scheduled as an alternative to scheduling DMRS(s) in a slot. In certain aspects, the capability information may help a network entity determine when DMRS(s) should be scheduled as an alternative to scheduling data-carrying pilot(s) in a slot. In certain aspects, the capability information may help a network entity determine how many DMRS symbols and/or data-carrying pilot symbols to schedule within a slot, as well as their locations. In certain aspects, the capability information may help a network entity determine when DMRS(s) and/or data-carrying pilots do not need to be scheduled in a slot, such as due to an ability of the UE to leverage DMRS sharing capabilities for channel estimation.

Techniques for signaling UE capability information related to the construction of virtual pilot(s), as described herein, may provide various beneficial technical effects and/or advantages. For example, the techniques for signaling this capability information may enable improved wireless communications performance, such as increased throughput, reduced overhead, and/or improved quality and reliability of communication. The increased throughput and reduced overhead may be attributable to the scheduling of data-carrying pilot(s) as an alternative to scheduling DMRS(s) in a slot, based on, for example, a network entity receiving information about a UE's capability to construct virtual pilots from the data-carrying pilots that are scheduled. The improved quality and reliability of communication may be attributable to the scheduling of data-carrying pilots within a slot for which a UE, receiving the data-carrying pilots, is capable of demodulating and using for virtual pilot construction to realize improved channel estimation performance.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
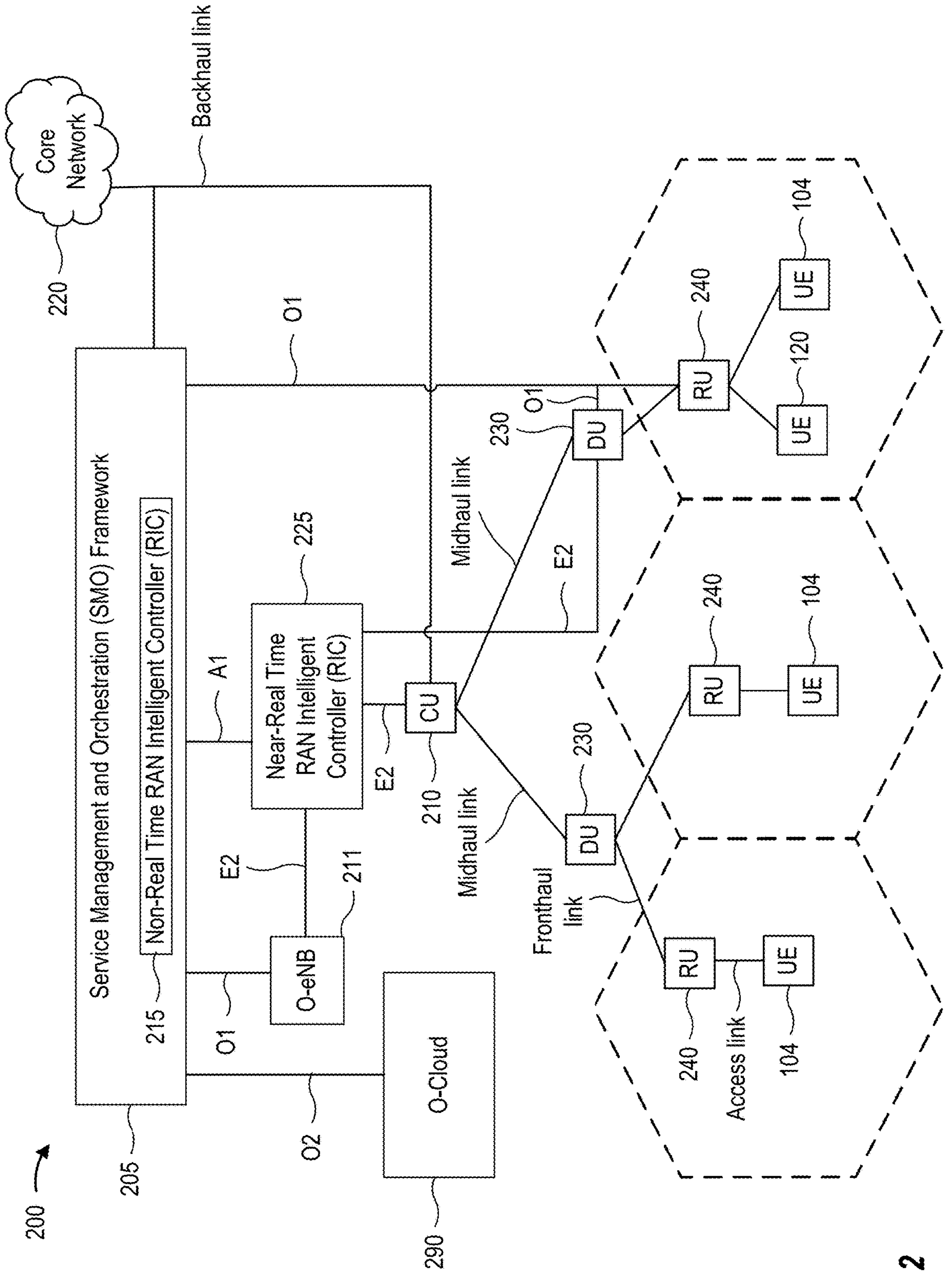
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-CNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
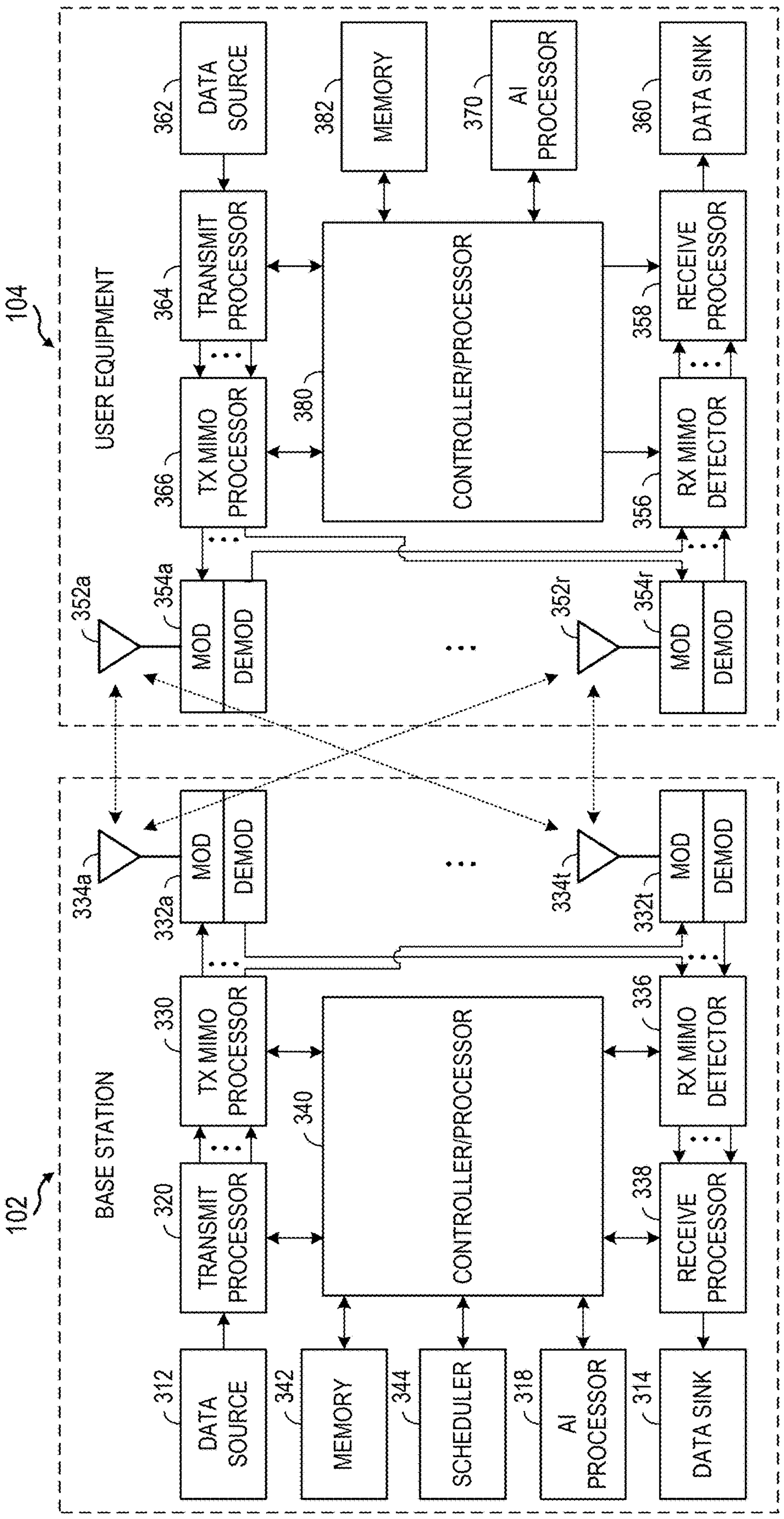
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
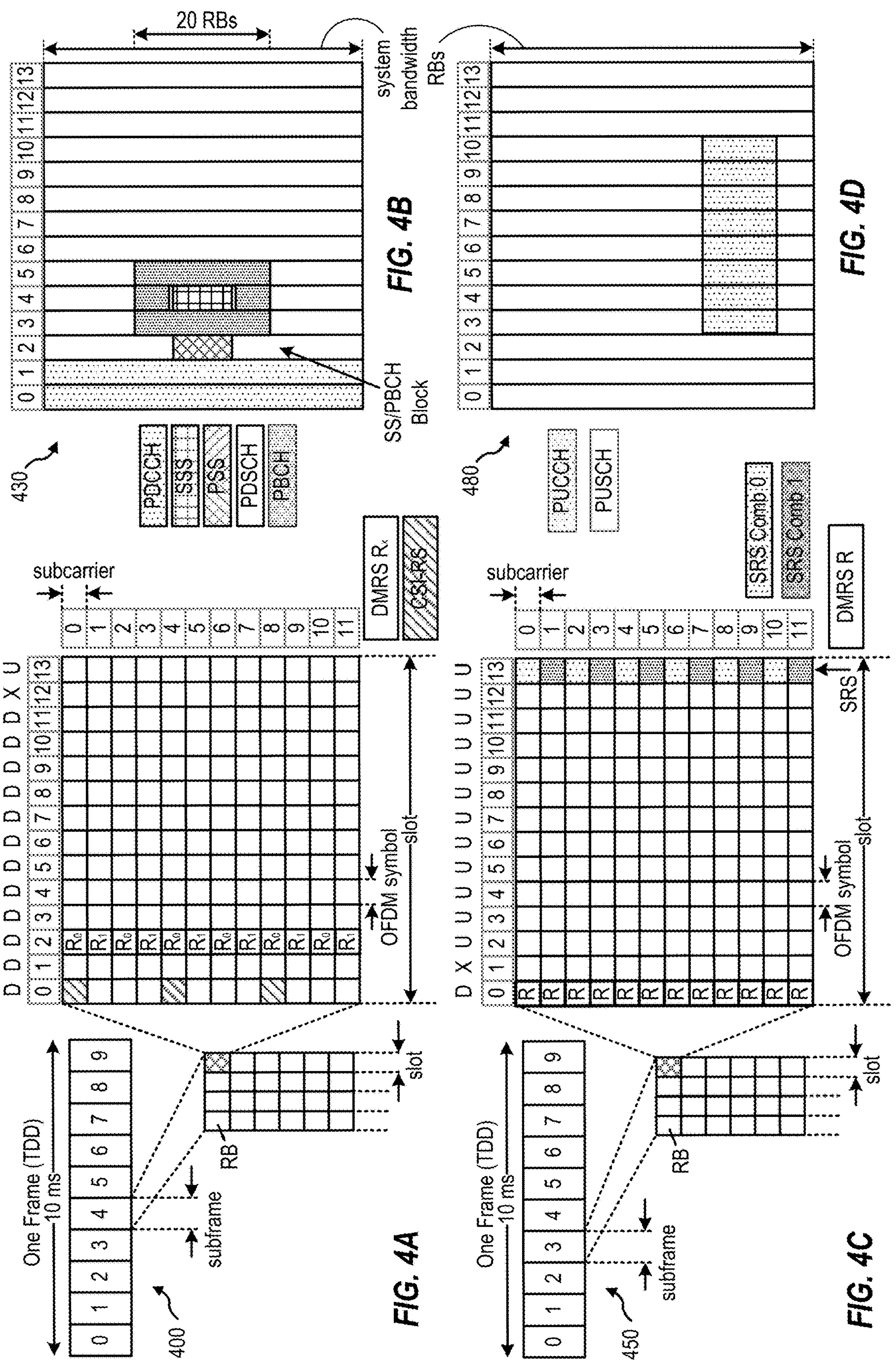
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology u, there are 24 slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times 15$ kHz, where u is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to DMRS-Based Channel Estimation

DMRSs are reference signals, transmitted in specific time-frequency resources, used to aid channel estimation and demodulation and/or decoding of a data signal. For example, a transmitter (e.g., a network entity, such as BS 102 depicted and described with respect to FIGS. 1 and 3 or a disaggregated base station depicted and described with respect to FIG. 2) may transmit a data signal and DMRS(s) in resources allocated for PDSCH transmission in a slot. A receiver (e.g., a UE such as UE 104 depicted and described with respect to FIGS. 1 and 3) may receive the DMRS(s) along with the data signal. It should be noted that DMRS(s) may also be used on the uplink, such as being transmitted in resources allocated for PUSCH transmission, such as from a UE to a network entity. The receiver may estimate channel coefficients at the symbol location(s) where the DMRS(s) are positioned in the slot (referred to herein as "DMRS symbol(s)") by comparing the received DMRS(s) with known DMRS sequences. After obtaining the channel estimates at one or more symbol locations in the slot, the receiver may interpolate and/or extrapolate the channel estimates to the symbol location(s) of the data in the slot (referred to herein as "data symbol(s)"). For example, interpolation techniques may be used to determine channel estimate(s) for data symbol(s) between two DMRS symbols within a slot. Extrapolation techniques may be used to determine channel estimate(s) for data symbol(s) occurring later in time than a DMRS symbol (and not between two DMRS symbols). With the estimated channel, the receiver may demodulate the data symbol(s) and recover the transmitted data.

The performance of DMRS-based channel estimation may depend on the time-domain density of the DMRS(s) in the slot (or the number of DMRS symbols in the slot). For example, a greater number of DMRS symbols within a slot helps to reduce the gap between channel estimates and/or reduce the requirement for long interpolations and extrapolations, thereby improving the performance of channel estimation.

Time-domain DMRS density within a slot may be depend on the PDSCH and/or DMRS configurations associated with the slot. Different configurations may indicate different numbers of PDSCH symbols that are allowed to be configured within different slots (e.g., the PDSCH duration); different numbers of DMRS symbols configured within different slots; the type of DMRS(s) configured (e.g., single- or double-symbol DMRS(s)); and/or a mapping of DMRS(s) to PDSCH resource elements. For example, a configured PDSCH DMRS mapping type may indicate a starting position of a DMRS symbol within the slot and/or a maximum PDSCH duration (e.g., maximum PDSCH symbol duration≤14 symbols or maximum PDSCH symbol duration≤7 symbols). Further, a number of additional DMRS symbols and their positions within a slot may be configured using a dmrs-AdditionalPosition parameter. The parameter dmrs-AdditionalPosition defines the maximum number of additional single- or double-symbol DMRSs configured for the slot to improve channel estimation.

While increased time-domain DMRS density may improve overall channel estimation performance in a slot, this improvement may be obtained at the cost of reduced data transmission capacity. For example, more PDSCH allocated time resources may be used for DMRS transmission. As such, it may be beneficial to find the right balance between time-domain DMRS density and data transmission capacity, in different scenarios, to achieve sufficient system performance.

For example, in high-mobility scenarios (e.g., such as high speed railways, vehicular ad hoc networks, and/or unmanned aerial vehicles (UAVs) communications, to name a few), increasing the density of time-domain DMRS, at the cost of reduced throughput, may be warranted. Specifically, due to the high mobility of a receiver, the channel may vary rapidly (e.g., resulting in large Doppler spread, which is a measure of spectral broadening caused by the time rate of change of the channel). To handle the fast variations in channel conditions, it may be useful to increase the density of the DMRS signals to obtain accurate channel estimates.

Accordingly, in this scenario, the network may schedule more than one DMRS symbol in the slot. Alternatively, in low-mobility scenarios (e.g., with low Doppler spread), the network may schedule one DMRS symbol per slot and achieve the same channel estimation performance.

Aspects Related to Channel Estimation Using Virtual Pilots

In certain aspects, increasing the number of DMRS symbols in a slot is not permitted. For such reasons, and/or in other cases, additional techniques for improving channel estimation performance may need to be considered. For example, only a single DMRS symbol may be allowed in a special slot, identified by the letter "S" in frame structures (e.g., DDDSU, indicating three downlink slots, one special slot, and one uplink slot), based on some wireless communication standards (e.g., such as 3GPP TS 38.211) and/or the ability of an S-slot to be scheduled with a reduced PDSCH length (e.g., PDSCH symbol duration≤7 symbols). Thus, increasing the time-domain DMRS density may not be feasible.

An S-slot may have a normal slot structure including fourteen symbols (e.g., symbol 0-symbol 13) (e.g., as described and depicted with respect to FIGS. 4A-4D), which may be used for uplink and/or downlink communications. In some cases, which may be different from some other slot types, an S-slot may include a guard period. A guard period is a period during which no transmission and no reception occurs. The guard period included in the S-slot may be used to avoid interference within a cell and ensure coexistence among cells by compensating for propagation delays. An example guard period duration in the S-slot may span two symbols, four symbols, or six symbols, among other options. In certain aspects, a guard period may be used to allow a UE enough time to switch its radio frequency (RF) circuitry from downlink to uplink, or vice versa.

In certain aspects, the PDSCH length configured for an S-slot may be less than or equal to seven symbols (e.g., PDSCH symbol duration ≤7 symbols of the total 14 symbols in the s-slot). In some cases, to achieve at least a threshold throughput when communicating in an S-slot, only one DMRS symbol may be scheduled in the slot. For example, based on the PDSCH length being small, wireless communication standards may limit the number of DMRS symbols in the slot to one DMRS symbol.

While one DMRS symbol may suffice in low-mobility scenarios where low Doppler spread is encountered (as described above), the channel estimation performance in high-mobility scenarios (e.g., where high Doppler spread occurs) may suffer without additional DMRS symbols scheduled by the network. As another example, poor channel estimation performance may additionally, or alternatively, occur in slots (e.g., non-special slots) used for uplink and/or downlink communication. For example, a number of DMRS symbols scheduled in a slot may be limited (e.g., limited to one DMRS symbol) for one or more reasons, such as to achieve a threshold level of throughput in the slot. Accordingly, channel estimates for data symbols occurring in the slot may be inaccurate due to the limited number of DMRS symbols in the slot. A receiver, using this channel estimate, may not be able to demodulate data received at the UE, or may incorrectly demodulate the received data.

This poor channel estimation may present a technical problem in wireless communication networks. For example, channel estimation is a key part of physical layer wireless communication. Accurate channel estimation helps in compensating for the amplitude and phase of a received data signal at a receiver, facilitating the precise recovery of the data signal when demodulated at the receiver. This helps to achieve reliable communication with high data rates. Thus, poor channel estimation may degrade the quality and reliability of communication in a wireless communications network, which, in some cases, may lead to a significant loss of throughput.

In certain aspects, virtual pilot(s) may be used to offset this channel estimation performance degradation, resulting from the use of a limited number of DMRS symbols in a data transmission (e.g., including both the DMRS(s) and a data signal). As described above, a virtual pilot is a proxy DMRS pilot that includes information used to estimate the radio channel for demodulation and/or decoding at the UE. A network entity may schedule one or more resources in a slot for carrying data-carrying pilots. The resource(s) may be associated with one or more symbols in the slot. A UE receiving the data-carrying pilots at the particular symbol location(s) may use the data-carrying pilots to construct virtual pilot(s) at the symbol location(s) (e.g., referred to herein as "virtual pilot symbol(s)"). Similar to DMRS symbols, the UE may use the virtual pilot symbol(s) to estimate the channel at these symbol location(s), and then use the channel estimate(s) to interpolate and/or extrapolate channel estimates for data symbols (e.g., used to communicate PDSCH data) in the slot. The channel estimated for each data symbol may be used to decode, demodulate, and recover the data associated with the respective data symbol.

Accordingly, virtual pilots may be used as alternatives to DMRS(s) to improve channel estimation performance. Unlike DMRS(s), virtual pilots may provide this channel estimation improvement without increasing overhead and without decreasing throughput. For example, virtual pilots may be constructed from data-carrying pilots, which carry user data. By leveraging data transmitted to a UE to construct virtual pilots, data throughput may be maximized. For instance, no additional signaling in the slot may be needed to construct the virtual pilots; thus, a number of symbols used to transmit data to a UE may be maximized and overhead resulting from the insertion of additional signaling in the slot may be minimized.

Figure 5:
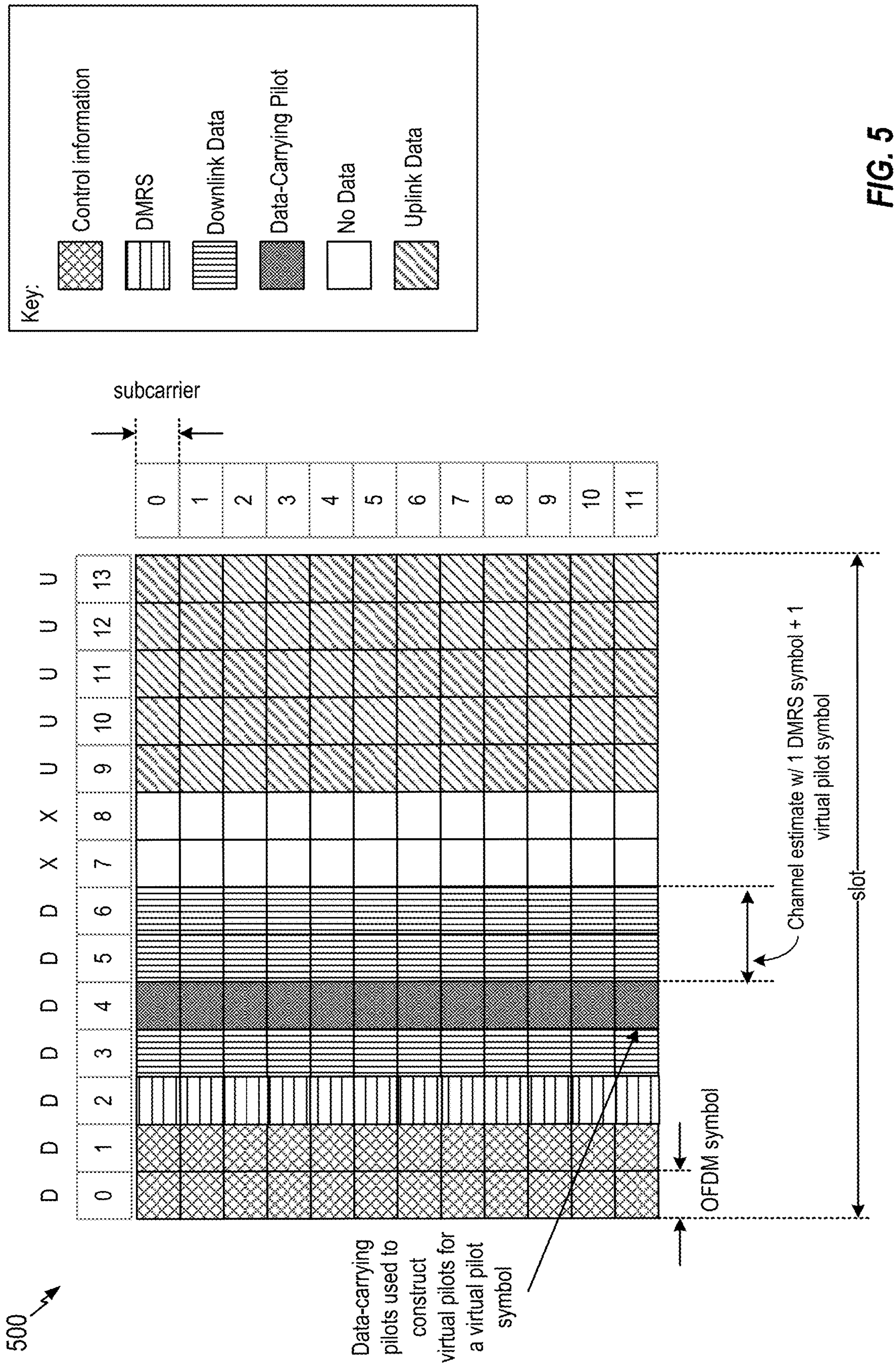
FIG. 5 depicts an example slot where virtual pilots may be constructed for improved channel estimation performance.

FIG. 5 depicts an example slot 500 where virtual pilots may be constructed for improved channel estimation performance. As shown, slot 500 is defined by a time-frequency resource grid including REs spanning fourteen OFDM symbols (simply referred to herein as "symbols") (e.g., symbol 0 through symbol 13) and twelve subcarriers (e.g., subcarrier 0 through subcarrier 11). An RE is the smallest unit of the time-frequency resource grid made up of one subcarrier in the frequency-domain and one symbol in the time-domain. REs in symbols 0 and 1 may be used to carry control information (e.g., DCI), for scheduling (e.g., allocating REs in slot 500) downlink data (e.g., a downlink data channel (PDSCH)), DMRS(s), data-carrying pilot(s), and/or uplink data (e.g., an uplink data channel (PUSCH)). In this example slot, REs in symbol 2 may be scheduled to carry DMRSs, REs in symbols 3, 5 and 6 may be scheduled to carry downlink data, REs in symbol 4 may be scheduled to carry data-carrying pilots, and REs in symbols 9-13 may be scheduled to carry uplink data.

A UE may determine a channel estimate from the DMRS(s) in symbol 2 (e.g., a DMRS symbol) by comparing the DMRS(s) received at this symbol location with known DMRS sequences. Further, the UE may construct virtual pilots from the data-carrying pilot(s) received at symbol 4 (e.g., construct a virtual pilot symbol). For example, the UE may use extrapolation techniques and the channel estimated based on the DMRS at symbol 2 to determine a channel estimate for symbol 4. Such channel estimate determined for symbol 4 may be used to demodulate and/or decode the downlink data transmitted at symbol 4 to construct a proxy DMRS, e.g., the virtual pilots or a virtual pilot symbol. The UE may use the virtual pilots to estimate the channel for symbol 4, e.g., estimate channel coefficients.

Accordingly, the virtual pilots at symbol 4 may act as "real" DMRS pilots and may be used in conjunction with the DMRS (e.g., the real DMRS pilots) received at symbol 2 to determine a channel estimate, such as for data symbols 5 and 6 in slot 500. For example, the channel estimate determined based on the DMRS received at symbol 2 and the channel estimate determined based on the virtual pilots constructed at symbol 4 may be used to extrapolate a channel estimate for symbol 5 to decode and/or demodulate data at symbol 5. Similarly, the channel estimate determined for symbol 2 and the channel estimate determined for symbol 4 may be used to extrapolate a channel estimate for symbol 6 to decode and/or demodulate data at symbol 6.

Construction of the virtual pilot symbol, as shown in slot 500, has the beneficial technical effect of improving overall channel estimation performance for the slot. For example, constructing the virtual pilot symbol for symbol 4 reduces the need for extrapolating the channel for symbol 3. Instead, interpolation techniques may be used to determine the channel estimate for symbol 3 based on the DMRS symbol and the virtual pilot symbol. When compared to extrapolation, interpolation may provide a more reliable estimation method. For example, interpolation may involve estimating an unknown channel estimate in between two known channel estimates (e.g., for symbol 2 and symbol 4). Extrapolation may involve estimating an unknown channel estimate based on known channel estimate(s) (e.g., for symbol 2 and/or for symbol 4), Doppler, and/or Jakes model. For example, a UE may use minimum mean square error (MMSE)-based interpolation/extrapolation techniques, which may make use of Doppler and/or Jakes model to estimate the channel at other symbols. Using such techniques, interpolation may be the preferred method because there may be a greater likelihood of obtaining a more accurate channel estimate. For example, a model based on interpolation/extrapolation may be dependent on the sample data for which the model is constructed. In this case, the sample data may be known channel estimate(s) for one or more DMRS symbols. When interpolating, a channel estimate determined an interpolated symbol may be closer to a sample mean or average, than when extrapolating, For example, when extrapolating, a channel estimate determined for an extrapolated symbol may be farther away from sample mean or average than when interpolating. Sample mean or average may provide a representation of model accuracy. For example, the closer to the sample mean or average the channel estimate determined for the interpolated and/or extrapolated symbol is, the better (e.g., the more accurate the channel estimate is determined for the interpolated symbol and/or the extrapolated symbol).

Additionally, determination of channel estimates for symbols 5 and 6, based on the channel estimates for the DMRS symbol (e.g., symbol 2) and the virtual pilot symbol (e.g., symbol 4), may help to achieve more accurate channel estimations for symbols 5 and 6 for recovering the data. Specifically, estimating the channels for symbols 5 and 6 based on two channel estimates, as opposed to a single channel estimate, may help to produce a more accurate estimation.

To realize the aforementioned advantages of using virtual pilots, a network entity may need to be aware of a UE's capability to construct virtual pilots, from data-carrying pilots in one or more symbols, for channel estimation. A network entity may adjust DMRS scheduling to realize channel estimation performance gains, increased throughput, and/or reduced overhead (e.g., compared to legacy deployments) based on this capability information.

Aspects Related to Resource Scheduling Based on Virtual Pilot Assisted Channel Estimation Capability at a UE Certain aspects described herein provide signaling designs used to support resource scheduling, by a network entity, for channel estimation. In certain aspects, the signaling includes information related to a capability of a UE to construct virtual pilot(s) for the performance of channel estimation. A network entity may dynamically determine the resources to be scheduled in a slot for channel estimation based on this capability information. The resources scheduled by the network entity, in the slot, may include (1) DMRS resource(s) in one or more symbols in the slot and/or (2) resource(s) for carrying data-carrying pilot(s) in one or more symbols in the slot. Scheduling data-carrying pilot(s) in the slot may trigger a UE receiving these data-carrying pilot(s) to construct virtual pilot(s) for the performance of channel estimation.

Channel estimation performance in the slot may be based on a number of DMRS symbols and/or data-carrying pilot symbols scheduled by the network entity in the slot. For example, as described above, a UE may use the DMRS(s) and/or virtual pilot(s) in the slot to estimate the channel for one or more symbol location(s) in the slot, and then use the channel estimate(s) to interpolate and/or extrapolate channel estimates for data symbols (e.g., used to communicate PDSCH data) in the slot. The channel estimates may be used to decode, demodulate, and recover the data associated with each respective data symbol.

In certain aspects, the network entity may schedule one or more data-carrying pilots in one or more symbols in the slot as an alternative to scheduling DMRS symbol(s) in the slot, based on the UE's capability information. Scheduling data-carrying pilot symbol(s) as a substitute to DMRS symbol(s) in the slot may help to (1) increase data transmission capacity and/or (2) reduce overhead in the slot, due to at least the reduction in non-data signaling (e.g., such as DMRS pilots) for channel estimation.

Further, in certain aspects, scheduling data-carrying pilot symbol(s) as a substitute to DMRS symbol(s) in a slot may help to achieve sufficient channel estimation performance in cases where a number of DMRS symbol(s) allowed in the slot is limited. For example, scheduling data-carrying pilot symbol(s) as a substitute to DMRS symbol(s) may benefit S-slots where scheduling more than one DMRS is not permitted, per wireless communication standards. As another example, scheduling data-carrying pilot symbol(s) as a substitute to DMRS symbol(s) may benefit slots where a number of DMRS symbols is limited (e.g., limited to one DMRS symbol) for example, to achieve a threshold level of throughput in the slot.

Figure 6:
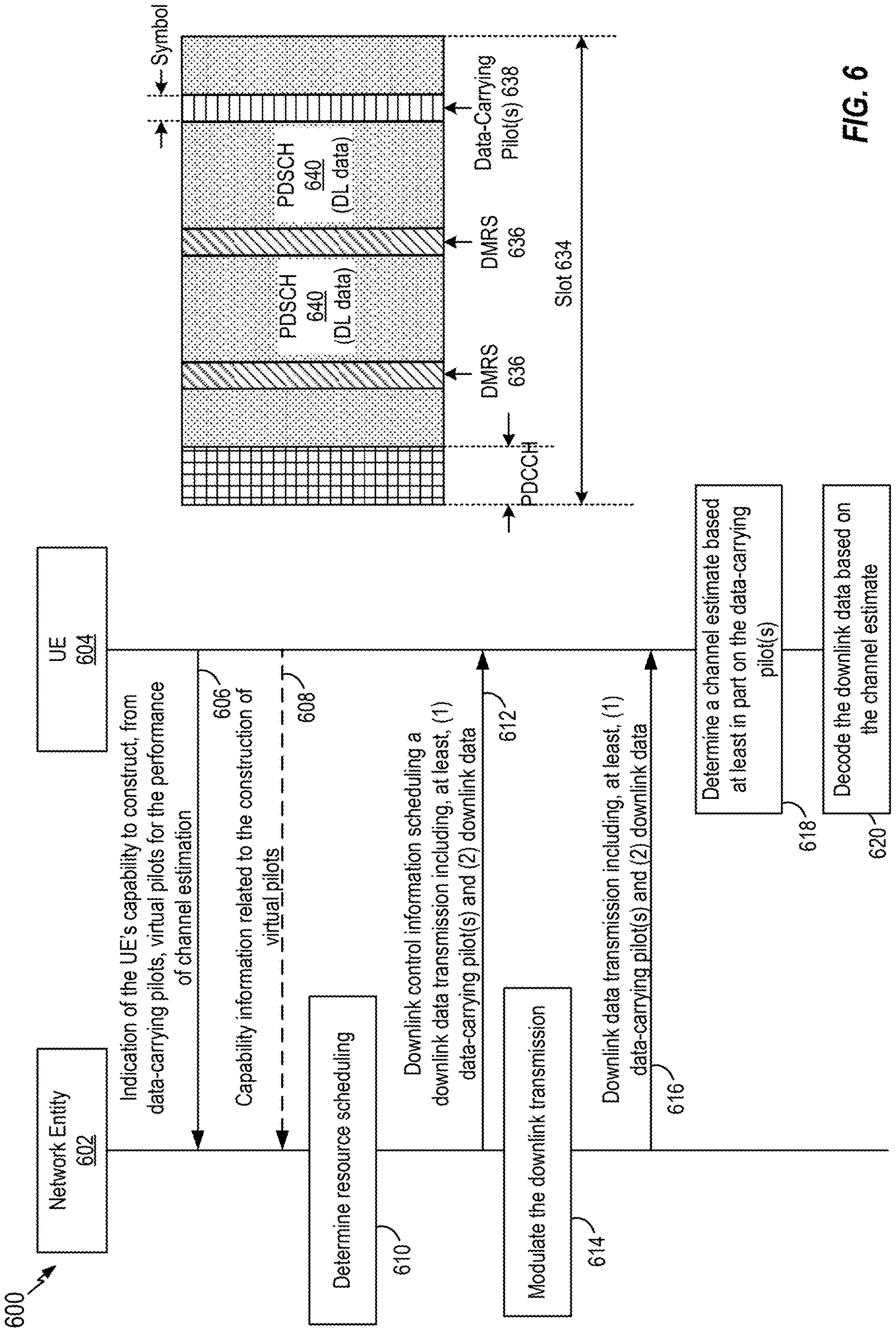
FIG. 6 depicts a process flow for communications in a network between a network entity and a UE used to support resource scheduling, by a network entity, for channel estimation.

Example Signaling of Capability Information Related to the Construction of Virtual Pilots for Resource Scheduling FIG. 6 depicts a process flow 600 for communications in a network between a network entity 602 and a UE 604. In certain aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and network entity 602 may be another type of network entity or network node, such as those described herein. Note that any operations or signaling illustrated with dashed lines may indicate that that operation or signaling is an optional or alternative example.

In certain aspects, UE 604 is a UE capable of constructing virtual pilots for channel estimation. For example, UE 604 may be capable of demodulating data-carrying pilots transmitted in one or more symbols in a slot to generate virtual pilots for channel estimation in the slot. UE 604 may report this capability to network entity 602 to aid network entity 602 in scheduling resources for channel estimation. For example at 606, UE 604 sends, to network entity 602, an indication of the UE 604's capability to construct virtual pilots from data-carrying pilots for the performance of channel estimation. In certain aspects, UE 604 sends the indication via radio resource control (RRC) signaling.

At 608, UE 604 optionally sends, to network entity 602, capability information related to the construction of virtual pilots at UE 604. The capability information sent, at 608, may be sent, to network entity 602, as one or more indications of capability information. In certain aspects, UE 604 sends each indication of the capability via RRC signaling.

In certain aspects, the capability information includes an indication of a Doppler spread threshold. As described above, Doppler spread is a measure of spectral broadening caused by the time rate of change of a communications channel. If a Doppler spread threshold is sent by UE 604, to network entity 602, then network entity 602 may use this Doppler spread threshold when scheduling resources for channel estimation. For example, network entity 602 may schedule one or more resources in a slot to carry data-carrying pilot(s) when the Doppler spread for the downlink channel is greater than the Doppler spread threshold (e.g., Doppler spread>Doppler spread threshold). Otherwise, network entity 602 may not schedule any data-carrying pilots within the slot. Network entity 602 may assume that UE 604 will utilize the scheduled data-carrying pilot(s), when scheduled, to construct virtual pilot(s) for channel estimation. In this case, the Doppler spread may be known to both network entity 602 and UE 604.

Doppler spread may be measured by UE 604 based on tracking reference signal(s) (TRS(s)) and/or SSB(s), which may be periodic and/or aperiodic downlink signals sent separately by network entity 602. In certain aspects, UE 604 may report (e.g., send an indication of) the Doppler spread to network entity 602. In certain aspects, network entity 602 may estimate the Doppler spread based on uplink SRS(s) received from UE 604 and use the estimated Doppler spread for downlink, assuming uplink and downlink reciprocity.

In certain aspects, the Doppler spread threshold may be based at least in part on UE 604 mobility, a numerology, and/or a frequency band used. As an illustrative example, for 2 gigahertz (GHz), with a 30 kilohertz (kHz) subcarrier spacing (SCS) band, a UE moving at 54 kilometers per hour (km/h) may experience a Doppler spread of up to 100 hertz (Hz). This Doppler spread may indicate that the channel coherence time is about 10 ms. In some cases, this time range may be sufficient for a virtual pilot to be reliable (e.g., depending on the spacing of the VP in a slot). In some other cases, this time range may not be sufficient for a virtual pilot to be reliable (e.g., depending on the spacing of the virtual pilot in a slot). A Doppler spread threshold may be determined based on this information.

Because constructing virtual pilots from data-carrying pilots, for channel estimation, comes at a cost (e.g., a memory cost, a power cost, complexity, etc. at the UE), in some cases, the construction of virtual pilots may not outweigh the cost. The Doppler spread threshold, when reported by UE 604 to network entity 602, may help to ensure that data-carrying pilot(s) are only scheduled when performance gains realized from using these data-carrying pilot(s) for virtual pilot construction, outweigh the cost of constructing the virtual pilot(s) at UE 604.

In certain aspects, the capability information includes an indication of a delay spread threshold. Delay spread is a measure of the multipath profile of a communications channel. Delay spread is generally defined as the difference between the time of arrival of an earliest multipath component and the time of arrival of a latest multipath component. If a delay spread threshold is sent by UE 604, to network entity 602, then network entity 602 may use this delay spread threshold when scheduling resources for channel estimation. For example, network entity 602 may schedule one or more resources in a slot to carry data-carrying pilot(s) when the delay spread for the downlink channel is less than the delay spread threshold (delay spread<delay spread threshold). Otherwise, network entity 602 may not schedule any data-carrying pilots within the slot. Network entity 602 may assume that UE 604 will utilize the data-carrying pilot(s), when scheduled, to construct virtual pilot(s) for channel estimation. In this case, the delay spread may be known to both network entity 602 and UE 604.

Similar to Doppler spread, delay spread may be measured by UE 604 based on TRS(s) and/or SSB(s) sent by network entity 602. In certain aspects, UE 604 may report (e.g., send an indication of) the delay spread to network entity 602. In certain aspects, network entity 602 may estimate the delay spread based on uplink SRS(s) received from UE 604 and use the estimated delay spread for downlink, assuming uplink and downlink reciprocity.

In certain aspects, the delay spread threshold may be based on a cell area range (e.g., a cellular diameter) that determines a frequency selectivity seen by UE 604 within that particular cell and/or a frequency domain granularity of a virtual pilot estimation by UE 604. In certain aspects, the delay threshold may be defined in terms of root mean square (RMS) delay of a channel.

At high delay spread for the downlink channel, the channel estimate performance gains obtained based on using virtual pilot(s) for channel estimate may be insignificant when compared to the cost incurred at UE 604 to construct the virtual pilot(s). As such, the delay spread threshold, when sent to network entity 602, may help to ensure that data-carrying pilot(s) are only scheduled when performance gains realized from using these data-carrying pilot(s), for virtual pilot construction, outweigh the cost of constructing the virtual pilot(s) at UE 604.

In certain aspects, UE 604 may estimate a virtual pilot based on a group of RBs. Because UE 604 may estimate a virtual pilot based on a group of RBs, a larger RB group size, in addition to a highly selective channel, may degrade virtual pilot quality.

In certain aspects, the capability information includes an indication of a bandwidth threshold. The bandwidth threshold may be a function of SCS and/or a number of DMRS ports that are scheduled for communication on the PDSCH.

As an illustrative example, UE 604 may be capable of constructing virtual pilot(s) on a 100 MHz allocation, and below, for rank 2 transmission (e.g., up to two independent data streams). If rank 4 transmission (e.g., up to four independent data streams) is needed, meaning the number of DMRS ports may be doubled, then UE 604 may support virtual pilot construction for a 50 MHz allocation or less.

In certain aspects, network entity 602 sends, to UE 604, the SCS via RRC signaling. In certain aspects, network entity 602 sends, to UE 604, a frequency domain bandwidth allocation and a DMRS ports configuration via DCI. For example, if a large number of DMRS ports are scheduled and the SCS is small, then the bandwidth threshold may be small. In certain aspects, the capability information includes an indication of a threshold number of RBs assigned to UE 604 per slot for PDSCH communication, on the symbols which may carry data-carrying pilots. In cases where the capability information includes the threshold number of RBs, the bandwidth threshold may be determined based on the threshold number of RBs (e.g., different bandwidths are associated with different numbers of RBs), or vice versa (e.g., given the SCS is known). The threshold number of RBs or the bandwidth threshold may be included in the capability information.

Network entity 602 may use the bandwidth threshold when scheduling resources for channel estimation. For example, network entity 602 may schedule one or more resources in a slot to carry data-carrying pilot(s) when the bandwidth is less than the bandwidth threshold (e.g., bandwidth<bandwidth threshold). Otherwise, network entity 602 may not schedule any data-carrying pilots within the slot. Again, network entity 602 may assume that UE 604 will utilize the data-carrying pilot(s), when scheduled, to construct virtual pilot(s) for channel estimation.

Computational power used to construct virtual pilot(s) from data-carrying pilot(s) for channel estimation may be significant when the bandwidth is high (e.g., 400 megahertz (MHz) or 800 MHZ). However, the channel estimate performance gain may be marginal. As such, the bandwidth threshold (and similarly and/or equivalently, the threshold number of RBs), when sent to network entity 602, may help to ensure that data-carrying pilot(s) are only scheduled when performance gains realized from using these data-carrying pilot(s) for virtual pilot construction, outweigh the cost of constructing the virtual pilot(s) at UE 604.

UE 604's timeline budget may only allow up to a certain number of RBs to be pipelined under N1 timeline constraints (e.g., N1 is the minimum time duration required after reception of a PDSCH and before UE 604 is ready to send HARQ ACK/NACK feedback for the PDSCH) and/or may allow up to a certain amount of chip area increase for storage and/or demodulation of data. For example, in cases where a large number of RBs are assigned to UE 604 on the data-carrying pilot symbols, UE 604 may need more time to process the RBs, which, in some cases, may be at the risk of exceeding the N1 timeline constraint. Accordingly, a cap on the number of RBs (e.g., a threshold number of RBs) may be implemented for virtual pilot processing.

Further, UE 604's on-chip storage/buffer size may only allow up to a certain number of RBs to be processed for virtual pilot construction (e.g., given intermediate data need to be stored, at least temporarily). For example, a low cost UE with limited storage may be incapable of virtual pilot processing.

In certain aspects, the capability information includes an indication of a maximum number of data-carrying pilots that UE 604 can process within a time period. For example, the capability information may include an indication of a maximum number of data-carrying pilots that UE 604 can process within a slot, across two slots, etc.

In certain aspects, the indication of the maximum number of data-carrying pilots that UE 604 can process may be indicated as a maximum number of symbol location(s), within a time period (e.g., within a slot), where UE 604 can process data-carrying pilots (e.g., a maximum number of data-carrying pilot symbols may be indicated). For example, UE 604 may indicate that UE 604 can process a maximum of two data-carrying pilot symbols within a slot. Thus, network entity 602 may schedule resource(s) for carrying data-carrying pilots in two or less symbols within the slot.

In certain aspects, UE 604 may send, to network entity 602, an indication of a maximum number of data-carrying pilots equal to zero, thereby indicating that UE 604 is not capable of constructing virtual pilot(s) for the performance of channel estimation. As such, network entity 602 may not schedule any resources for carrying data-carrying pilots.

Figure 7:
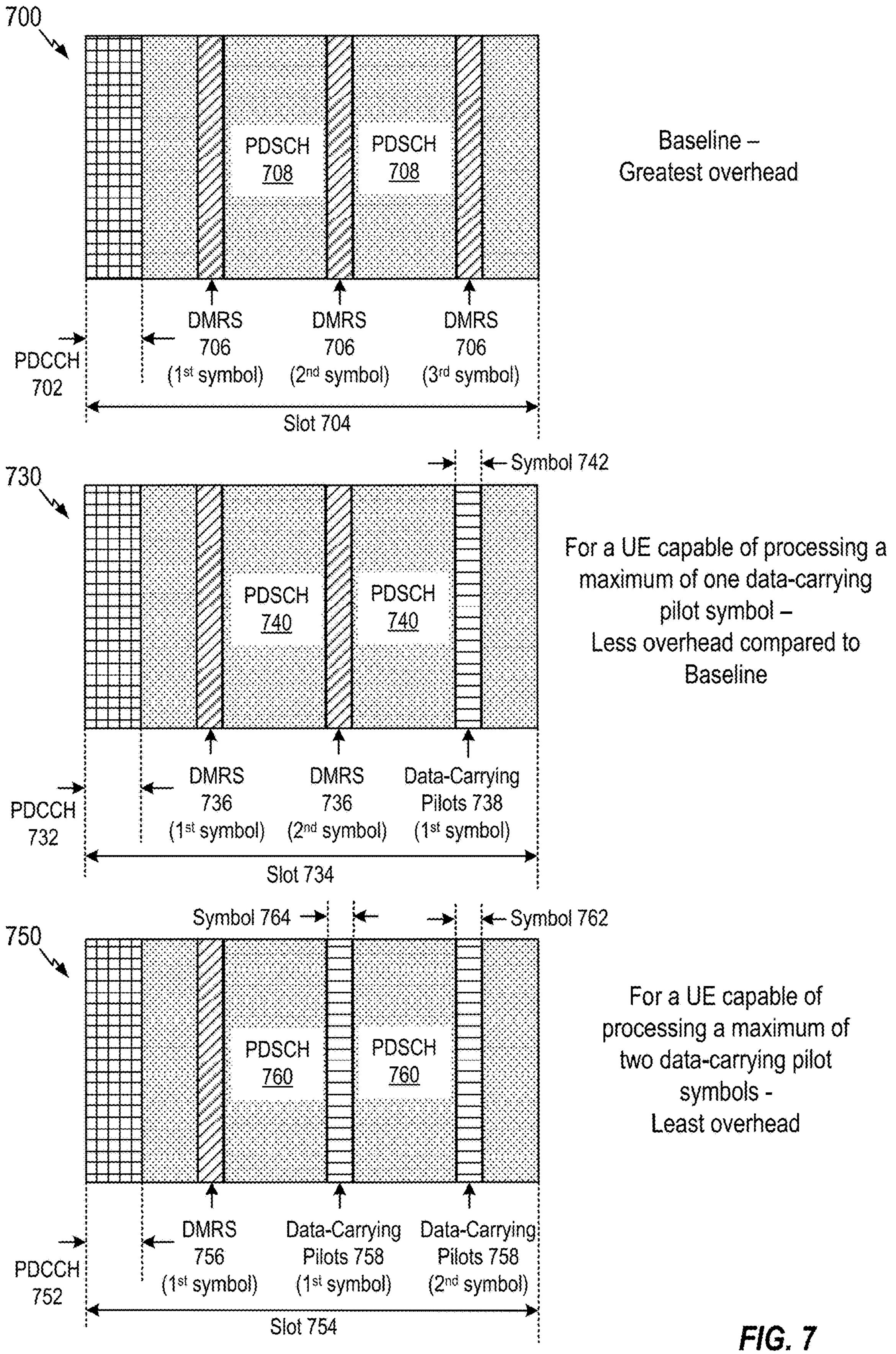
FIG. 7 depicts example overhead reduction that may be achieved when data-carrying pilots are scheduled in a slot to initiate virtual pilot construction for channel estimation.

An amount of overhead reduction that may be achieved when using virtual pilot(s) for channel estimation may be related to the maximum number of data-carrying pilots that UE 604 is capable of processing within a time period. This correlation is illustrated in FIG. 7. For example, FIG. 7 illustrates overhead reduction that may be achieved for (1) a first UE capable of processing data-carrying pilots in only one symbol location in the slot (e.g., capable of processing one data-carrying pilot symbol) and (2) for a second UE capable of processing data-carrying pilots in a maximum of two symbol locations in a slot (e.g., capable of processing two data-carrying pilot symbols). The overhead reduction achieved may be relative to a baseline case where no resources are scheduled to carry data-carrying pilots, and instead, only DMRSs are scheduled for channel estimation.

The baseline case, shown at 700 in FIG. 7, depicts an example slot 704. In slot 704, resources may be used to carry a PDCCH 702 (e.g., control information) scheduling a (1) a PDSCH 708 and (2) DMRS 706 in three symbol locations. DMRS 706 may be transmitted in slot 704 to enable a UE receiving DMRS 706 and PDSCH 708 to estimate channel conditions for demodulating and/or decoding PDSCH 708.

An example slot 734 that may be used to transmit downlink data to the first UE is shown at 730 in FIG. 7. In slot 734, resources may be used to carry a PDCCH 732 (e.g., control information) scheduling a (1) a PDSCH 740, (2) DMRSs 736 in two symbol locations, and (3) data-carrying pilot(s) 738 in one symbol location (e.g., symbol 742). In this case, the data-carrying pilot(s) 738 may be scheduled in symbol 742 as an alternative to scheduling DMRSs 736 in symbol 742, which may help to reduce DMRS signaling overhead. For example, greater overhead reduction may be achieved when compared to the baseline case shown at 700. The data-carrying pilot(s) 738, sent via symbol 742, may be used to construct virtual pilot(s) (e.g., proxy DMRS(s)) at symbol 742, which may be used in conjunction with DMRSs 736 to estimate the channel for demodulating and/or decoding PDSCH 740.

An example slot 754 that may be used to transmit downlink data to the second UE is shown at 750 in FIG. 7. In slot 754, resources may be used to carry a PDCCH 752 (e.g., control information) scheduling a (1) a PDSCH 760, (2) DMRS(s) 756 in one symbol location, and (3) data-carrying pilots 738 in two symbol locations (e.g., symbol 762 and symbol 764). In this case, the data-carrying pilots 758 may be scheduled in symbols 762, 764 as an alternative to scheduling DMRS 756 in symbols 762, 764, which may help to reduce DMRS signaling overhead. For example, the greatest amount of overhead reduction may be achieved in this case when compared to the cases shown at 700 and 730 in FIG. 7. The data-carrying pilots 758, sent via symbols 762, 764, may be used to construct virtual pilots (e.g., proxy DMRSs) at symbols 762, 764, which may be used in conjunction with DMRS 756 to estimate the channel for demodulating and/or decoding PDSCH 760.

Returning to FIG. 6, in certain aspects, the capability information (e.g., sent by UE 604 to network entity 602) includes an indication of UE 604's support for data-carrying pilots under virtual RB to physical RB (VRB-to-PRB) interleaving (e.g., the mapping of VRBs to PRBs for actual transmission). A VRB is an abstraction of a PRB, which includes the modulation symbols that are mapped to the PRB. A PRB is the physical resource allocation in the time frequency grid. For example, network entity 602 may deploy VRB-to-PRB mapping. In certain aspects, VRB-to-PRB mapping complexity may be manageable at UE 604; thus, UE 604 may indicate, to network entity 602, that UE 604 does support VRB-to-PRB mapping for data-carrying pilots. Network entity 602 may schedule one or more data-carrying pilots in a slot based on this indication. In certain other aspects, VRB-to-PRB mapping complexity may not be manageable at UE 604. For example, re-interleaving data demodulation outputs from a virtual RB domain to a physical RB domain may be computationally intensive for UE 604 to perform, and in some case, this additional work to map VRBs to PRBs may offset the performance benefits of scheduling data-carrying pilots in a slot. As such, UE 604 may indicate that it does not support VRB-to-PRB mapping for data-carrying pilots. Network entity 602 may not schedule any data-carrying pilots in the slot based on this indication.

In certain aspects, the capability information includes an indication of a minimum duration, m, after the reception of a data-carrying pilot that UE 604 is required to wait before using the data-carrying pilot to re-estimate the channel for decoding and/or demodulating PDSCH symbols. In certain aspects, the minimum duration, m, is indicated as one or more symbols in a slot. In certain aspects, the minimum duration, m, is a function of UE 604 processing (e.g., demodulation/channel estimation processing delay and/or delay due to transfer from demodulation to channel estimation buffers). The indicated minimum duration, m, may be used by network entity 602 when determining whether DMRS and/or data-carrying pilots can be scheduled at a particular symbol location in a slot.

Figure 8:
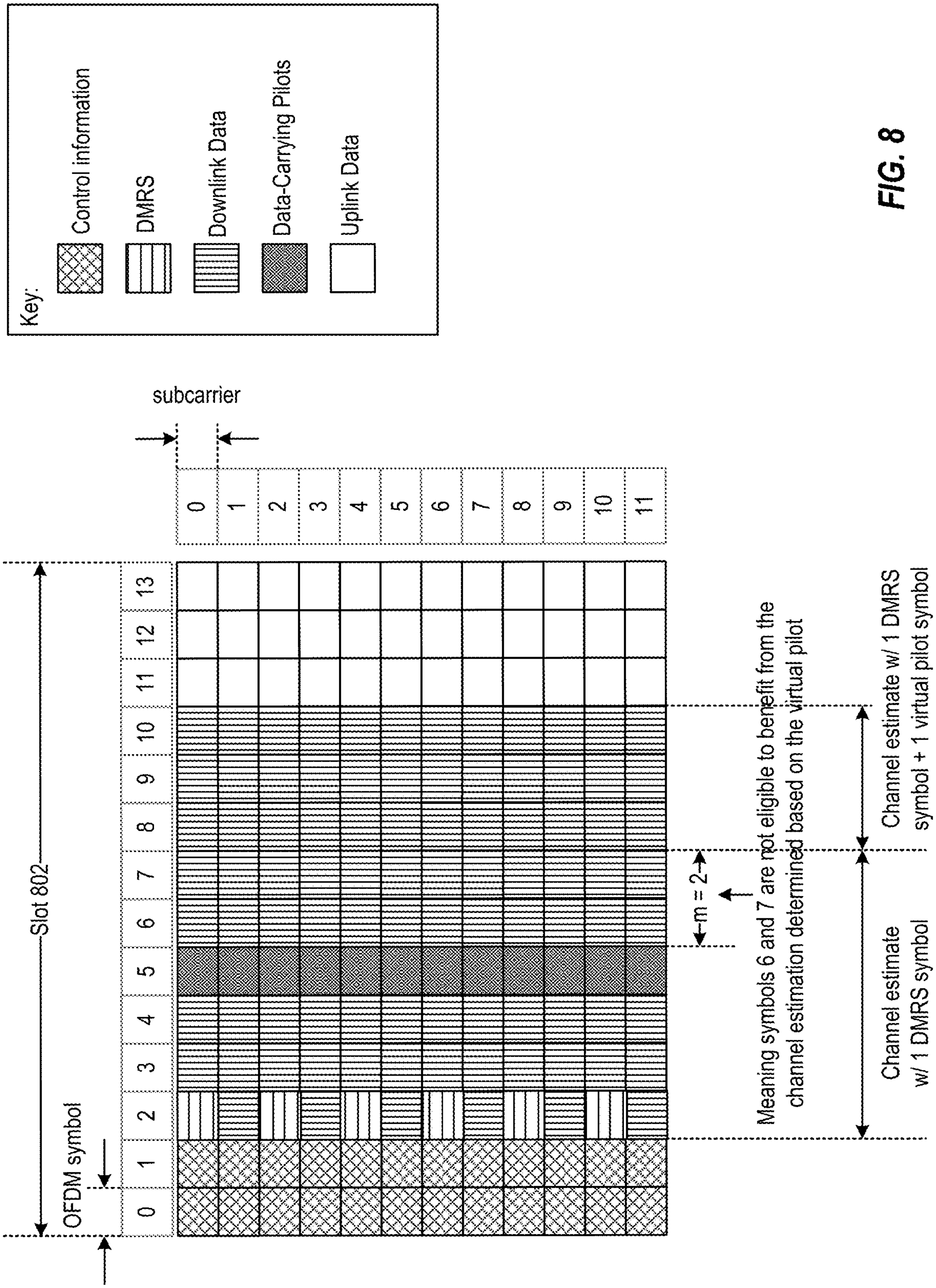
FIG. 8 depicts an example minimum duration that may be indicated to assist a network entity in resource scheduling for channel estimation in a slot.

FIG. 8 depicts an example minimum duration, m, that may be indicated to assist network entity 602 in scheduling DMRS and/or data-carrying pilots within a slot. Although not meant to be limiting to this particular example, in FIG. 8, the minimum duration, m, is equal to two symbols in a slot, and may indicate that at least two symbols, immediately after a symbol where data-carrying pilots are received in the slot, may not be able to benefit from the channel estimate determined based on these data-carrying pilots.

For example, in FIG. 8, an example slot 802 may be used to transmit downlink data (e.g., via PDSCH) to a UE, such as UE 604 in FIG. 6. Specifically, slot 802 may include (1) resource elements in symbols 0 and 1 used to carry PDCCH (e.g., control information for scheduling the downlink data), (2) resource elements in symbol 2 used to carry DMRS(s), (3) resource elements in symbols 3, 4, and 6-10 used to carry downlink data, and (4) resource elements in symbol 5 used to carry data-carrying pilot(s).

The UE may determine a channel estimate for symbol 2 (e.g., a DMRS symbol) by comparing the DMRS(s) received at this symbol location with known DMRS sequences. Further, the UE may use extrapolation techniques and the channel estimated for symbol 2 to determine a channel estimate for symbol 5. The channel estimate determined for symbol 5 may be used to demodulate and/or decode the data-carrying pilots to construct virtual pilots at symbol 5 (e.g., construct a virtual pilot symbol at symbol 5).

Here, because the minimum duration, m=2, the UE may not be able to use the virtual pilots, constructed at symbol 5, to determine the channel estimates for symbols 6 and 7 (e.g., for the demodulation and/or decoding of PDSCH data at these symbols). Put differently, symbols 6 and 7 may not be eligible to benefit from the virtual pilots in symbol 5 for channel estimation. Instead, the channel estimates for symbols 6 and 7 may be determined using extrapolation techniques and the channel estimation for symbol 2 (e.g., determined based on DMRSs transmitted at symbol 2). Unlike symbols 6 and 7, however, channel estimation performance for symbols 8-10 may be improved via use of the virtual pilots at symbol 5, in addition to the DMRSs at symbol 2.

Accordingly, determination of channel estimates for symbols 3, 4, 6, and 7 may be based on only the channel estimate for the DMRS symbol (e.g., symbol 2). Determination of channel estimates for symbols 8-10 may be based on the channel estimates for the DMRS symbol (e.g., symbol 2) and the virtual pilot symbol (e.g., symbol 5).

Thus, the first symbol where both channel estimates may be leveraged for extrapolating a channel estimation is symbol 8. A network entity, such as network entity 602 in FIG. 6, may use this symbol location to determine if data-carrying pilots should be scheduled or not, and if so, the symbol location of the data-carrying pilots that are to be scheduled in the slot.

For example, in cases where the minimum duration, m, is high, the network entity may schedule DMRSs in a particular symbol location in a slot, instead of data-carrying pilots. In doing so, the network entity may ignore the UE's capability to construct virtual pilots for performance of channel estimation.

Data-carrying pilots scheduled at a symbol close (e.g., near in time) to a DMRS symbol in a slot may allow for a more reliable channel reconstruction (e.g., based on both the DMRSs and virtual pilots constructed from the data-carrying pilots). However, this slot placement of the data-carrying pilots may require additional extrapolation to determine channel estimates for symbols later in time in the slot (and occurring after the symbol location where the virtual pilots are constructed). On the other hand, data-carrying pilots scheduled at a symbol further away from a DMRS symbol in a slot (e.g., scheduled in a symbol located at the end of the slot) may result in less reliable channel reconstruction, however less extrapolation. In certain aspects, a network entity may determine a symbol location for scheduling data-carrying pilots based on a robustness (e.g., a modulation and coding scheme (MCS), etc.) of the data-carrying pilots (e.g., lower MCS than the rest of a slot may make the data-carrying pilots more robust by casing demodulation and/or decoding). For example, data-carrying pilots may be scheduled at symbols occurring near the end of a slot based on a robustness of the data-carrying pilots.

Returning to FIG. 6, in certain aspects, the capability information (e.g., sent by UE 604 to network entity 602) includes an indication of a maximum duration, D, between scheduling of (1) a DMRS and (2) a data-carrying pilot. For example, the maximum duration, D, may indicate a maximum duration (e.g., spacing between symbols) allowed between a symbol location where the DMRS is scheduled and a symbol location where the data-carrying pilot is scheduled that satisfies a reliability threshold. Satisfaction of the reliability threshold indicates that a channel reconstruction, based on the DMRS and a virtual pilot constructed from the data-carrying pilot, achieves a level of reliability that is above the reliability threshold. As described above, a data-carrying pilot scheduled at a symbol closer (e.g., more near in time) to a DMRS symbol in a slot may allow for a more reliable channel reconstruction than a data-carrying pilot scheduled at a symbol farther away from the DMRS symbol in the slot for a given Doppler spread. If a spacing between a symbol location of a scheduled DMRS and a symbol location where a data-carrying pilot is scheduled (e.g., a duration between these symbols) is greater than a maximum duration, D, then the reliability threshold may not be met and channel estimation performance may be degraded.

In certain aspects, UE 604 sends, to network entity 602, an indication of the reliability threshold and/or a reliability measure that is to be used for determining the maximum duration, D, instead of explicitly sending an indication of the maximum duration, D, to network entity 602. For example, network entity 602 and UE 604 may agree, via RRC signaling, what reliability measure (e.g., corresponding to a reliability threshold) should be used for determining the maximum duration, D. In certain aspects, the reliability measure is based on an aggregate of cyclic redundancy checks (CRCs) overlapping the symbol location where data-carrying pilot(s) are scheduled. In certain aspects, the reliability measure is based on an aggregate of CRCs overlapping a last symbol of a PDSCH scheduled for UE 604.

In certain aspects, the maximum duration, D, is UE-specific. For example, the maximum duration, D, may depend on a virtual pilot implementation at UE 604, or more specifically, a quality of estimation or a quality of a de-noising algorithm used by UE 604. In certain aspects, the maximum duration, D, is dependent on a signal-to-noise ratio (SNR) for the downlink channel. The SNR may be the nominal SNR at each of UE 604's receive antennas. Depending on UE implementation, the SNR may be based on DMRS, TRS, and/or any other downlink reference signal measurement(s). For example, the maximum duration, D, may be greater for a higher SNR (e.g., indicating that the signal level is greater than the noise level) than a lower SNR (e.g., indicating that the signal level is less than the noise level). In certain aspects, the maximum duration, D, is a function of Doppler spread of the downlink channel. For example, the maximum duration, D, may be smaller when the Doppler spread is larger (e.g., the Doppler spread may affect channel estimation performance) than when the Doppler spread is smaller.

Network entity 602 may use the indicated maximum duration, D, to schedule resources (e.g., DMRS resources and/or resources for carrying data-carrying pilots) for channel estimation. For example, in certain aspects, network entity 602 may compare the indicated maximum duration, D, to a maximum duration, $\overline{D}$, between scheduling of (1) a first DMRS and (2) a second DMRS. Put differently, the maximum duration, $\overline{D}$, may indicate a maximum duration (e.g., spacing between symbols) allowed, between a symbol location where the first DMRS is scheduled and a symbol location where the second DMRS is scheduled, that satisfies the reliability threshold (e.g., the same reliability threshold satisfied by the maximum duration, D). The maximum duration, $\overline{D}$, may be related to a scenario where data-carrying pilots are not scheduled by network entity 602, and thus virtual pilots are constructed for the performance of channel estimation.

In certain aspects, if the maximum duration, D, is greater than or equal to the maximum duration, $\overline{D}$ (e.g., $D \geq \overline{D}$), then network entity 602 may schedule fewer DMRS resource(s) and alternatively schedule one or more resources for carrying data-carrying pilot(s). In certain aspects, if the maximum duration, D, is less than the maximum duration, $\overline{D}$ (e.g., $D < \overline{D}$), then network entity 602 may choose to ignore UE 604's capability to construct virtual pilots for the performance of channel estimation, and thus, not schedule any resources for carrying data-carrying pilots. Instead, network entity 602 may schedule DMRS resources in symbol locations that satisfy the maximum duration, $\overline{D}$.

Figure 9A:
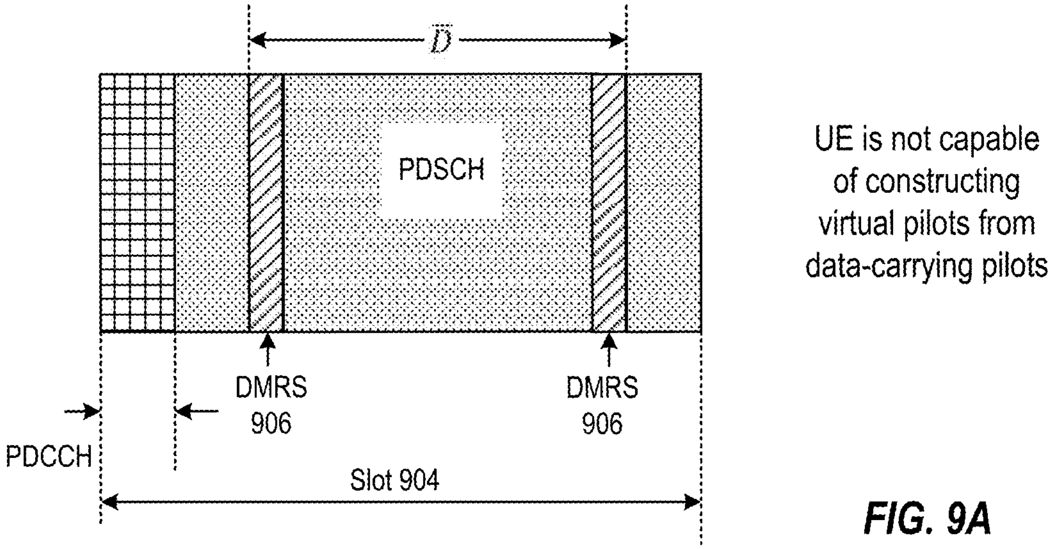
FIG. 9A depicts an example maximum duration allowed between the scheduling of two DMRSs.
Figure 9B:
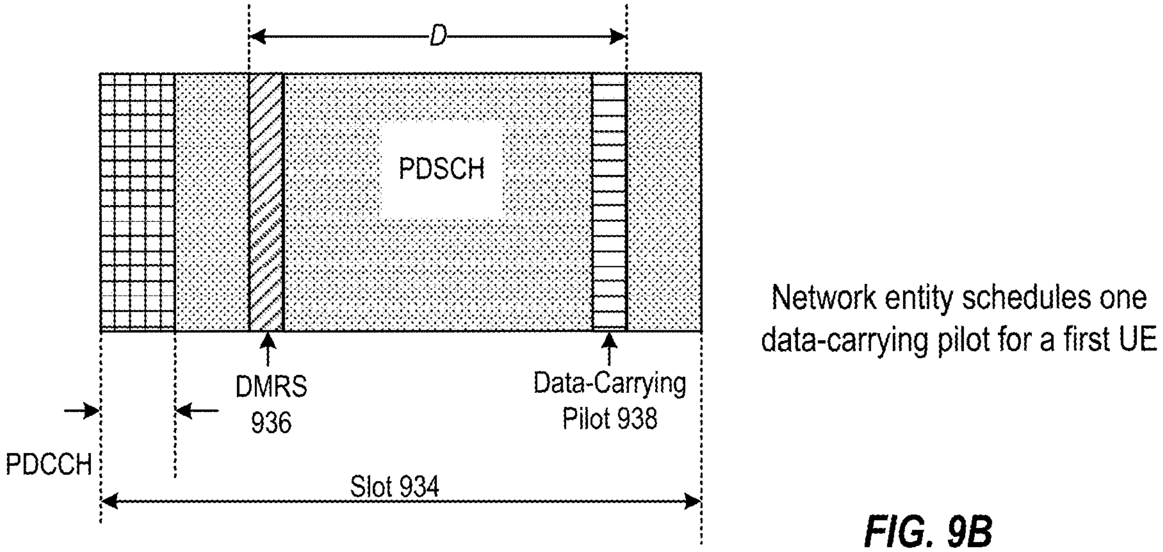
FIGS. 9B-9C depict example maximum durations allowed between the scheduling of a DMRS and a data-carrying pilot for different UEs.
Figure 9C:
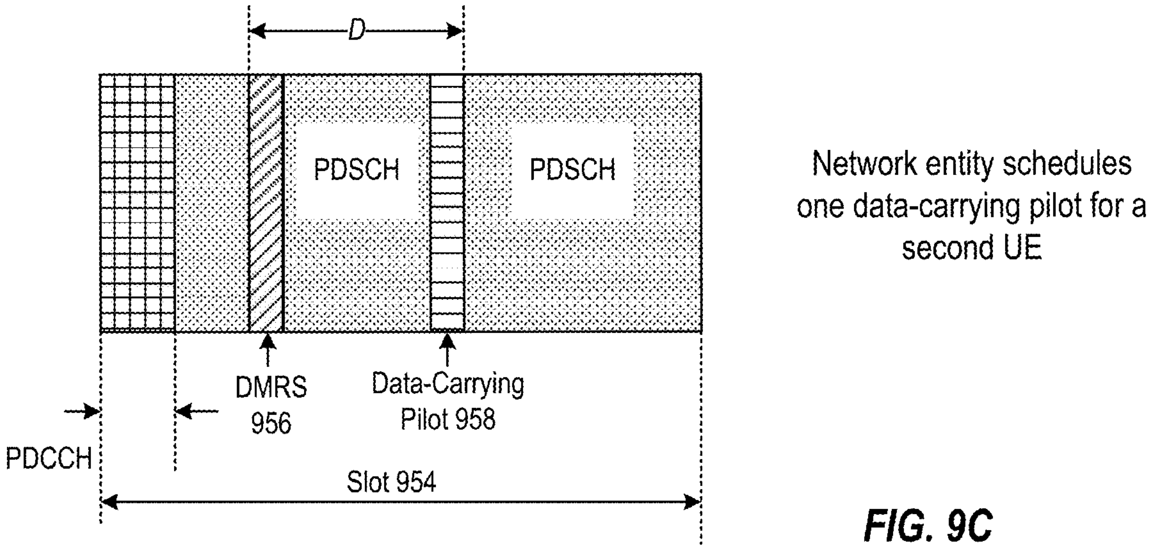

FIG. 9A depicts an example maximum duration, $\overline{D}$, allowed between the scheduling of two DMRSs. FIGS. 9B-9C depict example maximum durations, D, allowed between the scheduling of a DMRS and a data-carrying pilot for different UEs.

FIG. 9A depicts a baseline case where a UE, such as UE 604 in FIG. 6, is not capable of constructing virtual pilots from data-carrying pilots. As such, in FIG. 9A, only DMRSs 906 are scheduled in slot 904 for channel estimation. The maximum duration allowed between (a start of) a first DMRS 906 and (an end of) a second DRMS 906 in slot 904 is represented as $\overline{D}$. As long as the duration between the first and second DMRSs is less than or equal to $\overline{D}$, then channel reconstruction based on the first and second DMRSs 906 may achieve a level of reliability that is above a reliability threshold.

FIG. 9B depicts a first case where a first UE, such as UE 604 in FIG. 6, is capable of constructing virtual pilots from data-carrying pilots. As such, in FIG. 9B, a DMRS 936 and a data-carrying pilot 938 may be scheduled in slot 934 for channel estimation. The maximum duration allowed between (a start of) the DMRS 936 and (an end of) the data-carrying pilot 938 in slot 934 is represented as D. As long as the duration between the DMRS 936 and data-carrying pilot 938 is less than or equal to D, then channel reconstruction based on DMRS 936 and a virtual pilot constructed based on data-carrying pilot 938 may achieve a level of reliability that is above the reliability threshold.

FIG. 9C depicts a second case where a second UE, such as UE 604 in FIG. 6, is capable of constructing virtual pilots from data-carrying pilots. As such, in FIG. 9C, a DMRS 956 and a data-carrying pilot 958 may be scheduled in slot 954 for channel estimation. The maximum duration allowed between (a start of) the DMRS 956 and (an end of) the data-carrying pilot 958 in slot 954 is represented as D. As long as the duration between the DMRS 956 and data-carrying pilot 958 is less than or equal to D, then channel reconstruction based on DMRS 956 and a virtual pilot constructed based on data-carrying pilot 958 may achieve a level of reliability that is above the reliability threshold.

As indicated above, the maximum duration, D, may be UE-specific. Thus, as shown in FIGS. 9B and 9C, the maximum duration, D, for the first UE may be different than the maximum duration, D for the second UE. For the different maximum duration, D, the same level of reliability may be achieved.

In cases where a network entity (e.g., such as network entity 602 in FIG. 6) receives an indication of the maximum duration, D, for the first UE, then the network entity may schedule fewer DMRS resource(s) and alternatively schedule one or more resources for carrying data-carrying pilot(s) when communicating with the first UE (e.g., because $D \geq \overline{D}$).

Alternatively, in cases where the network entity receives an indication of the maximum duration, D, for the second UE, then the network entity may choose to ignore the capability of the second UE to construct virtual pilots for the performance of channel estimation, and thus, not schedule any resources for carrying data-carrying pilots (e.g., because $D<\overline{D}$). Instead, network entity 602 may schedule DMRS resources in symbol locations that satisfy the maximum duration, $\overline{D}$, similar to the baseline cases shown in FIG. 9A.

Returning to FIG. 6, in certain aspects, the capability information (e.g., sent by UE 604 to network entity 602) includes an indication of a category of UE 604. The category may be a category that exists among multiple categories. In certain aspects, the multiple categories are constant across a cell. In certain aspects, the multiple categories are constant across different UE groups. In certain aspects, the multiple categories are known across UEs, including UE 604, and network entity 602 (e.g., may be preconfigured). Each category (among the multiple categories) may be associated with a different capability for constructing virtual pilots from data-carrying pilots.

For example, in one implementation, multiple UEs may be associated with different categories (e.g., such as three different categories) based on a mechanism used by each UE for demodulating data of the data-carrying pilots and reconstructing virtual pilots (e.g., such as log likelihood ratio (LLR) demodulation). Constructing virtual pilots using the capabilities associated with the third category may be more reliable than constructing virtual pilots using the capabilities associated with the first and second categories. Further, constructing virtual pilots using the capabilities associated with the second category may be more reliable than constructing virtual pilots using the capabilities associated with the first category. However, the capabilities associated with the first category may be less computationally complex than the capabilities associated with the second and third categories, while the capabilities associated with the second category may be less computationally complex than the capabilities associated with the third category.

Although only three categories are described herein, and more specifically, only three different capabilities are considered for constructing virtual pilots from data-carrying pilots, in certain other examples, more or less categories may be created that are associated with one or more different capabilities for constructing virtual pilots.

In certain aspects, network entity 606 ignores the category associated with UE 604 and does not schedule any data-carrying pilots. In certain other aspects, network entity 606 uses the category associated with UE 604 to determine the number of symbol locations where resources for carrying data-carrying pilots should be scheduled. For example, network entity 606 may schedule less data-carrying pilot symbols when UE 604 is associated with the first category (e.g., with the least reliability) than when UE 604 is associated with the second or third categories. Further, network entity 606 may schedule less data-carrying pilot symbols when UE 604 is associated with the second category (e.g., with medium reliability) than when UE 604 is associated with the third category (e.g., with the most reliability). This scheduling of data-carrying pilot symbols based on the category of UE 604 is depicted in FIG. 10.

Figure 10:
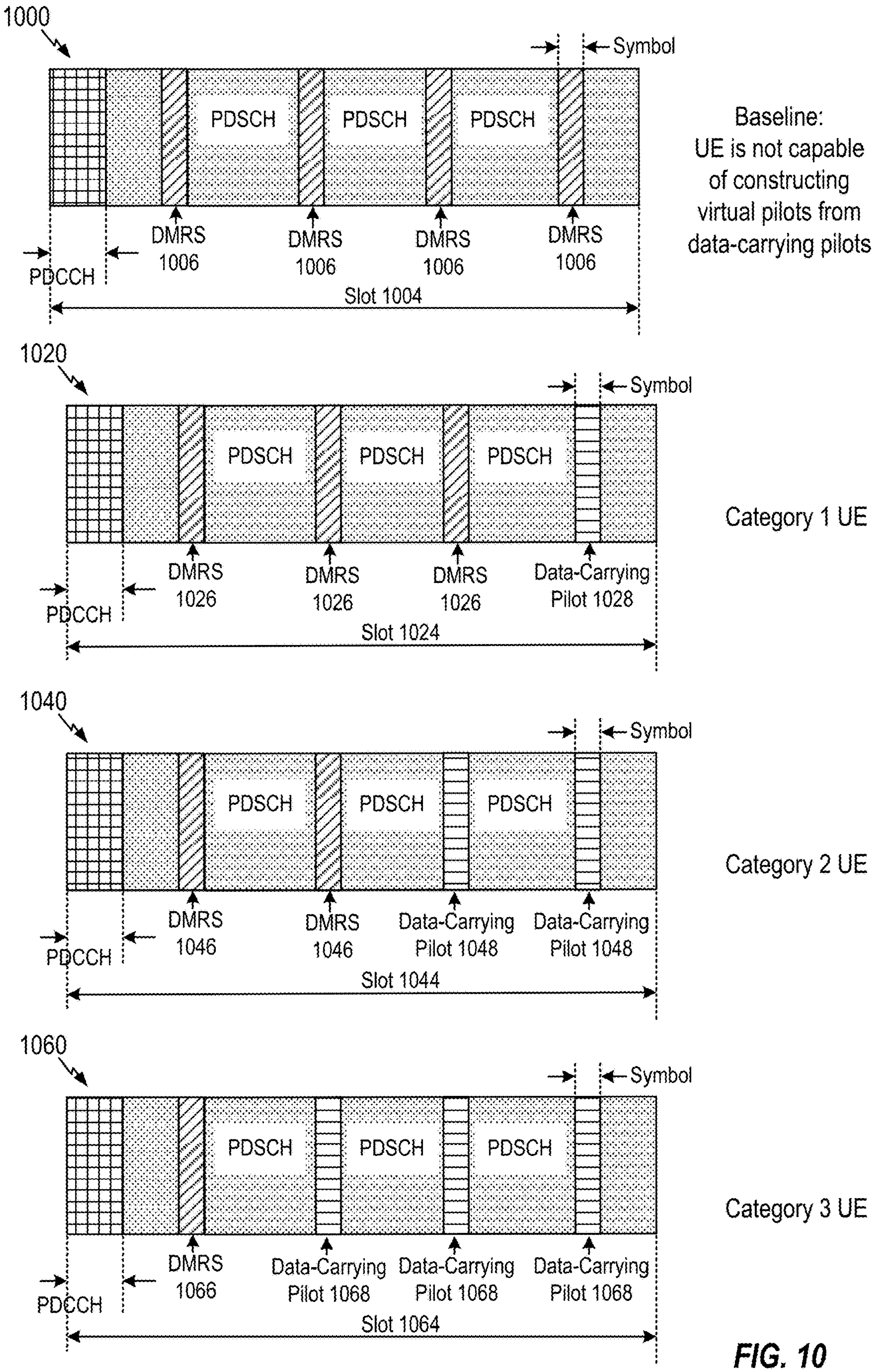
FIG. 10 depicts example data-carrying pilot scheduling based on a UE-associated category.

For example, as shown at 1000 in FIG. 10, network entity 606 may schedule DMRSs 1006 in a slot 1004 for a UE, such as UE 604 in FIG. 6, that is not capable of constructing virtual pilots from data-carrying pilots. In this example, the network entity may schedule DMRS 1006 at four symbol locations in slot 1004.

For a UE capable of constructing virtual pilots from data-carrying pilots, however, a number of symbol locations in a slot where data-carrying pilots are scheduled may be dependent on a category associated with the UE. For example, for a UE associated with the first category (described above), the network entity may schedule DMRS 1026 at three symbol locations and one data-carrying pilot 1028 at one symbol location in slot 1024 (as shown at 1020 in FIG. 10). For a UE associated with the second category (described above), the network entity may schedule DMRS 1046 at two symbol locations and two data-carrying pilots 1048 at two symbol locations in slot 1044 (as shown at 1040 in FIG. 10). In certain aspects, the DMRS 1046 and the data-carrying pilots 1048 may be alternated or interleaved in the time domain. Additionally, for a UE associated with the third category (described above), the network entity may schedule DMRS 1066 at one symbol location and three data-carrying pilots 1068 at three symbol locations in slot 1064 (as shown at 1060 in FIG. 10).

It is noted that the different scheduling of DMRS and data-carrying pilots for UEs associated with different categories, as shown in FIG. 10, is only one example of resource scheduling that may be used to enable channel estimation at each of the different category UEs. As such, other resource scheduling may be considered for different category UEs and/or more or less categories may be considered when determining the scheduling of such resources for channel estimation.

Returning to FIG. 6, after receiving (1) the indication of UE 604's capability to construct virtual pilots for the performance of channel estimation at 606 and optionally, (2) capability information related to the construction of virtual pilots at 608, network entity 602 determines, at 610, the resource scheduling for a slot 634. For example, network entity 602 may determine whether one or more DMRS and/or data-carrying pilots should be scheduled in slot 634, and if so, their symbol locations. In certain aspects, network entity 602 determines the resource scheduling based on (1) the indication of UE 604's capability to construct virtual pilots for the performance of channel estimation and/or (2) capability information related to the construction of virtual pilots (as described in detail above).

Based on this resource scheduling, network entity 602 constructs DCI and, at 612, sends the DCI to UE 604, the DCI. The DCI may be sent via a PDCCH in slot 634. In this example, the DCI may schedule a downlink data transmission including, at least, data-carrying pilot(s) and downlink data. For example, the DCI may schedule PDSCH 640 (e.g., the downlink data) and data-carrying pilot(s) in one symbol location within slot 634. Further, the DCI may schedule DMRSs 636 in two symbol locations within slot 634. It is noted that the resource scheduling shown in FIG. 6 is only one example of resource scheduling that may be determined and scheduled by network entity 602. For example, other resource scheduling, including more or less symbol locations for DMRS 636, more or less symbol locations for data-carrying pilot(s) 638, etc., may be considered.

At 614, network entity 602 modulates the downlink transmission. In certain aspects, network entity 602 modulates the data-carrying pilot(s) in the downlink transmission with a modulation order and/or modulation and coding scheme (MCS) different than the downlink data (e.g., PDSCH) in the downlink transmission. For example, the modulation order used to modulate the data-carrying pilot(s) may be lower than the modulation order used to modulate the downlink data (e.g., 64 quadrature amplitude modulation (QAM) for the data-carrying pilot(s) and 256 QAM for the downlink data). Different modulation orders and/or MCSs may be used to distinguish the data-carrying pilot(s) from the downlink data. Further, different modulation orders and/or MCSs may be used to enable UE 604 to more easily demodulate the data-carrying pilot(s) to construct virtual pilots for the performance of channel estimation.

At 616, network entity 602 sends, to UE 604, the downlink data transmission including, at least, the data-carrying pilot(s) and the downlink data.

At 618, UE 604 determines a channel estimate based at least in part on the data-carrying pilot(s). For example, UE 604 may determine to construct virtual pilot(s) and determine a channel estimate for the symbol location where the data-carrying pilot(s) were sent.

At 620, UE 604 uses this channel estimate to decode the downlink data. For example, as described above, interpolation and/or extrapolation techniques may be used to determine a channel estimate for each symbol where downlink data is received (e.g., determine channel estimate(s) for the PDSCH data symbol(s)). UE 604 may use these channel estimates to demodulate, decode, and recover the downlink data.

Note that the process flow illustrated in FIG. 6 is described herein to facilitate an understanding of resource scheduling for channel estimation when a UE is capable of constructing virtual pilots and aspects of the present disclosure may be performed in various manners via alternative or additional signaling and/or operations. In certain aspects, the operations and/or signaling of FIG. 6 may occur in an order different from that described or depicted, and various actions, operations, and/or signaling may be added, omitted, or combined.

In certain aspects, one or more failures may occur after a transmission, to a UE, of DMRS, data-carrying pilot(s), and/or downlink data in a slot. For example, the UE may fail to properly construct virtual pilot(s) from the data-carrying pilot(s) for channel estimation, the UE may be unable to estimate the channel at different symbols in the slot, and/or the decoding and/or demodulation to recover the downlink data may fail. Thus, in certain aspects, retransmission of the transmission may be warranted. For example, the UE may send, to the network entity, hybrid automatic repeat request (HARQ) negative acknowledgement (NACK) feedback based on one or more errors occurring. In response to receiving the HARQ NACK feedback, the network entity may send, to the UE, a retransmission of the original transmission. In certain aspects, multiple retransmissions of the original transmission are used to enable to the UE to receive and recover the downlink data.

In certain aspects, the number of DMRS symbols may increase for each subsequent retransmission. Similarly, the number of data-carrying pilot symbols may decrease for each subsequent retransmission. For example, the network entity may reserve a most optimistic DMRS pattern (e.g., based on UE's virtual pilot construction capability) for the original transmission and progressively adopt more conservative DMRS patterns in subsequent retransmissions. An optimistic DMRS pattern may include fewer DMRS symbols and instead a greater number of symbol locations where data-carrying pilots are scheduled. Alternatively, a conservative DMRS pattern may include a greater number of DMRS symbols with data-carrying pilots scheduled at only a few (or a minimal amount of) symbol locations.

Figure 11:
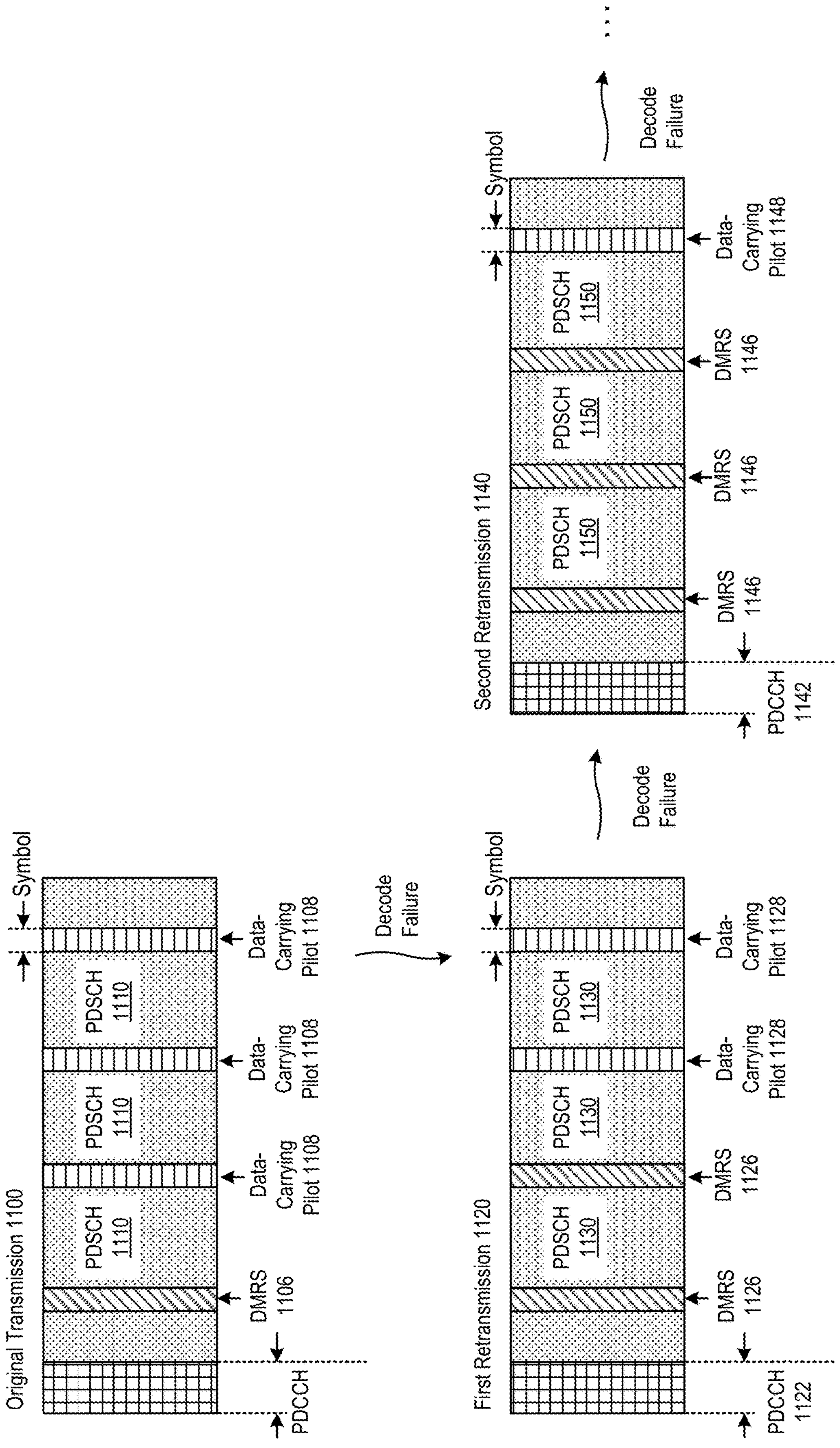
FIG. 11 depicts example changes in scheduled DMRSs for subsequent retransmissions of an original downlink transmission.

FIG. 11 depicts example changes in scheduled DMRSs for subsequent retransmissions of an original downlink transmission. As shown, an original transmission 1100, sent by a network entity (e.g., such as BS 102 of FIGS. 1 and 3, or a disaggregated base station as discussed with respect to FIG. 2) to a UE (e.g., such as UE 104 described above with respect to FIGS. 1 and 3), may include (1) one DMRS symbol where DMRS 1106 is scheduled and (2) three data-carrying pilot symbols where data-carrying pilots 1108 are scheduled.

Based on a failure to decode original transmission 1100, the UE may send, to the network entity, a HARQ NACK with respect to the original transmission 1100 (not shown in FIG. 11). In response to sending the HARQ NACK, the UE may receive a first retransmission 1120 (e.g., of the original transmission 1100). The first retransmission 1120, sent by the network entity to the UE, may include (1) two DMRS symbols where DMRSs 1126 are scheduled and (2) two data-carrying pilot symbols where data-carrying pilots 1128 are scheduled.

Based on a failure to decode first retransmission 1120, the UE may send, to the network entity, a HARQ NACK with respect to the first retransmission 1120 (not shown in FIG. 11). In response to sending the HARQ NACK, the UE may receive a second retransmission 1140 (e.g., of the original transmission 1100). The second retransmission 1140, sent by the network entity to the UE, may include (1) three DMRS symbols where DMRSs 1146 are scheduled and (2) one data-carrying pilot symbol where data-carrying pilots 1148 are scheduled.

Although not shown in FIG. 11, if the UE is unable to decode the second retransmission 1140, then a third retransmission (of the original transmission 1100) may be sent. The third retransmission, sent by the network entity to the UE, may include only DMRS symbols where DMRSs are scheduled and no data-carrying pilot symbols (e.g., no data-carrying pilots may be scheduled even though the UE is capable of constructing virtual pilots, from data-carrying pilots, for the performance of channel estimation).

In certain aspects, a network entity may also be capable of constructing virtual pilots, from data-carrying pilots, for channel estimation in the uplink. As such, the network entity may schedule DMRS in fewer DMRS symbols in the uplink and instead supplement with robust data-carrying pilots. For example, a UE may receive, from a network entity, an indication of one or more uplink resources that are scheduled to carry one or more uplink data-carrying pilots. The UE may use the scheduled uplink resource(s) to send uplink data-carrying pilot(s) to the network entity. In certain aspects, the network entity may inform the UE about the modulation order and/or MCS that is to be used for modulating the data-carrying pilot(s) for transmission. The modulation order and/or MCS used to modulate the data-carrying pilot(s) may be different than the modulation order and/or MCS use to modulate uplink data transmitted with the data-carrying pilot(s).

The transmission of data-carrying pilots by the UE, as a substitute to transmitting DMRS(s) may result in power savings at the UE (e.g., at least due to the transmission of fewer DMRS(s)). The UE may also benefit from reduced complexity based on the transmission of data-carrying pilot(s) as a substitute to DMRS transmission.

Example DMRS Sharing to Construct Virtual Pilots

In certain aspects, DMRS sharing across PDSCH communications, directed to a same UE or to different UEs, may be used for the construction of virtual pilots to improve channel estimation performance.

In certain aspects, DMRS sharing may be enabled in the time domain such that a UE leverages DMRS(s) from PDSCH communication(s) transmitted in earlier time transmission interval(s) (TTI(s)) (e.g., where a TTI refers to a duration of time in which a network entity is capable of scheduling any user for uplink or downlink communication) to construct virtual pilots in a slot of a current TTI. The virtual pilots may be used to improve channel estimation performance in the slot. In certain aspects, the DMRS(s) leveraged by the UE are from PDSCH communications(s) scheduled for the UE. In certain aspects, the DMRS(s) leveraged by the UE are from PDSCH communication(s) scheduled for one or more other UEs.

Figure 12:
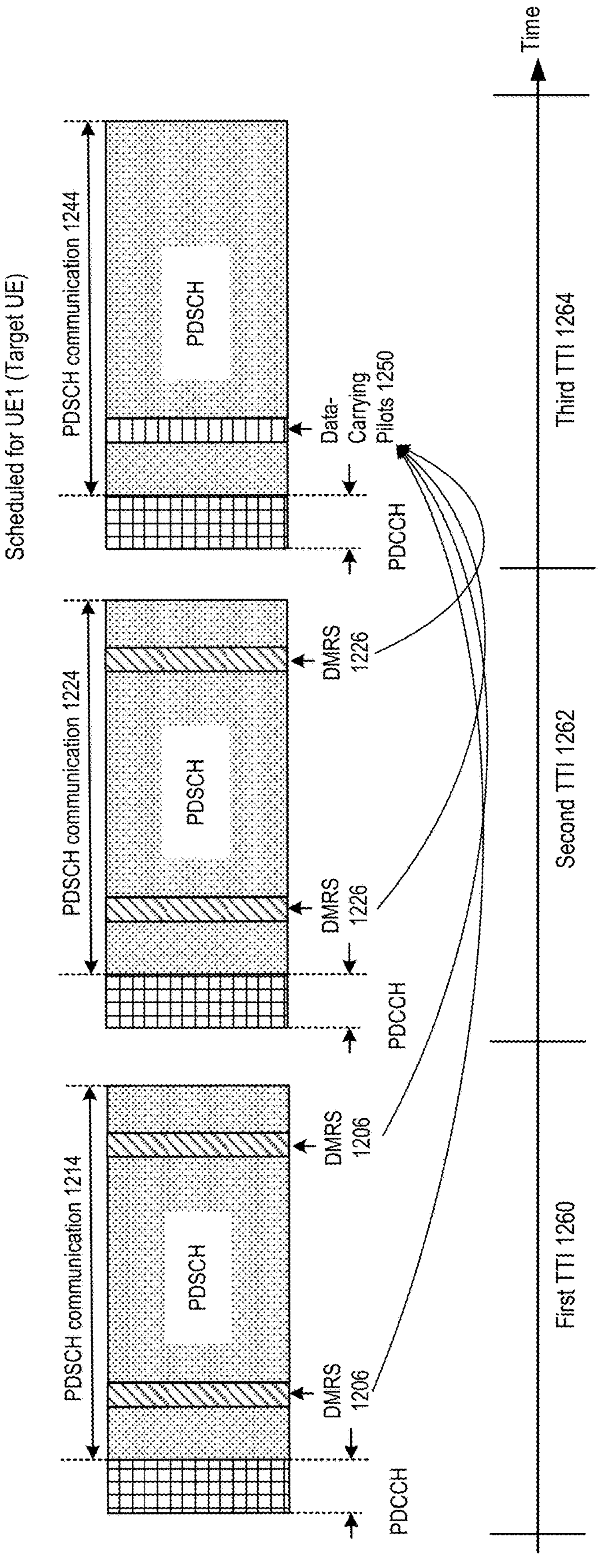
FIG. 12 depicts example DMRS sharing in the time domain for virtual pilot construction.

Example DMRS sharing in the time domain for virtual pilot construction is depicted in FIG. 12. As shown, (1) a PDSCH communication 1214 is scheduled in a first TTI 1260, (2) a PDSCH communication 1224 is scheduled in a second TTI 1262, and (3) a PDSCH communication 1244 is scheduled in a third TTI 1264. In certain aspects, PDSCH communications 1214, 1224, 1244 are scheduled for a single UE, such as UE1 in this example. In certain other aspects, PDSCH communications 1214, 1224, 1244 are scheduled for different UEs. For example, PDSCH communication 1244 may be scheduled for UE1; however, PDSCH communication 1214 and/or PDSCH 1224 may be scheduled for different UE(s). UE1 and/or other UE(s) may each be example(s) of UE 104 depicted and described with respect to FIGS. 1 and 3.

DMRSs 1206 may be scheduled in two symbols in PDSCH communication 1214. DMRSs 1226 may be scheduled in two symbols in PDSCH communication 1224. No DMRSs may be scheduled in PDSCH communication 1244; however, data-carrying pilots 1250 may be scheduled in one symbol in PDSCH communication 1244. Although two DMRS symbols are scheduled in PDSCH communication 1214 and two DMRS symbols are scheduled in PDSCH communication 1224, as shown in FIG. 12, in some other examples, more or less DMRSs may be scheduled in each PDSCH communication, and the number of DMRSs scheduled per PDSCH communication may vary.

In this example, UE1 may be a target UE, or a UE intended to utilize buffered DMRS information to demodulate and/or decode data-carrying pilots 1250 in PDSCH communication 1244 to construct virtual pilots for the performance of channel estimation. For example, UE1 may be a UE capable of constructing virtual pilots from data-carrying pilots.

UE1 may buffer DMRS information for (1) DMRSs 1206 included in PDSCH communication 1214 and/or for (2) DMRSs 1226 included in PDSCH communication 1224. The DMRS information associated with DMRSs 1206, 1226, and buffered by UE1 may include one or more channel estimates based on DMRSs 1206 and/or one or more channel estimates based on DMRSs 1226.

In certain aspects, to enable UE1 to buffer DMRS information for demodulating and/or decoding data-carrying pilots 1250 in PDSCH communication 1244, UE1 may receive an indication to utilize one or more DMRSs from one or more TTIs prior to a current TTI where the data-carrying pilots are transmitted, for virtual pilot construction. For example, in FIG. 12, UE1 may receive an indication to buffer (1) DMRS information associated with DMRSs 1206 in PDSCH communication 1214 and/or (2) DMRS information associated with DMRSs 1226 in PDSCH communication 1224.

In certain aspects (e.g. a first option), the indication to utilize the DMRS(s) is received, at UE1, in a group common DCI (GC-DCI) intended for a group of UEs that includes UE1. The GC-DCI may be sent prior to PDSCH communication 1214 to allow UE1 to begin buffering the DMRSs 1206 from PDSCH communication 1214 and DMRSs 1226 from PDSCH communication 1224. For example, UEs may be grouped into one or more groups of UEs (e.g., preconfigured groups) for receiving GC-DCI in a common search space (e.g., search spaces are generally configurations of time-frequency resources where a communications device, such as the group of UEs including UE1, may look for (e.g., monitor for) control information). Each UE belonging to each group of UEs may be a UE capable of utilizing DMRS(s) from PDSCH communication(s) transmitted in prior TTI(s). In certain aspects, the group of UEs, including UE1, may be configured with a radio network temporary identifier (RNTI) common to the group of UEs (e.g., a "common RNTI"). The GC-DCI may include CRC scrambled by the common RNTI such that only UEs in the group, including UE1, are able to decode the GC-DCI and receive the indication to utilize DMRS sharing for virtual pilot(s) construction.

In certain aspects (e.g. a second option), the indication to utilize the DMRS(s) is received, at UE1, in a UE-specific DCI intended for UE1. The UE-specific DCI may indicate, to UE1 only, that UE1 is to utilize DMRS sharing for virtual pilot(s) construction. In certain aspects, UE1 may be configured with a radio network temporary identifier (RNTI) unique to UE1. The UE-specific DCI may include CRC scrambled by the RNTI such that only UE1 is able to decode the UE-specific DCI and receive the indication to utilize DMRS sharing for virtual pilot(s) construction.

In certain aspects, UE1 may receive an indication of one or more common configurations for communication of DMRSs 1206 in PDSCH communication 1214 (e.g., in first TTI 1260) and/or DMRSs 1226 in PDSCH communication 1224 (e.g., in second TTI 1262). In certain aspects, UE1 may receive the indication of the common configuration(s) via GC-DCI or UE-specific DCI. The common configurations used for communication of DMRS 1206 and DMRSs 1226 may include: a frequency domain resource allocation (FDRA), a DMRS configuration type, a precoding resource block group (PRG) size, a precoder type, and/or a DMRS scrambling identity (e.g., DMRS scrambling ID0 or ID1). In certain aspects, DMRSs 1206 and/or DMRSs 1226 may be precoded as indicated via the common configurations such that UE1 is able to demodulate data-carrying pilots 1250.

In certain aspects, UE1 may receive an indication of a location of each of DMRSs 1206 in PDSCH communication 1214 and a location of each of DMRSs 1226 in PDSCH communication 1224. In certain aspects, UE1 may receive the indication of the location via GC-DCI or UE-specific DCI. This indication may enable UE to locate the DMRSs 1206, 1226 for channel estimation and buffering.

In certain aspects, UE1 may indicate, to a network entity scheduling PDSCH communications 1214, 1224, and 1244, a maximum number of DMRSs that UE1 is able to store channel estimation information for, for virtual pilot(s) construction. In certain aspects, UE1 indicates this information via RRC signaling. In certain aspects, the network entity may determine which DMRSs, in which TTIs, UE1 should store channel estimates for to perform virtual pilot(s) construction in a current slot.

In certain aspects, DMRS sharing may, additionally or alternatively, be enabled in the frequency domain such that a UE leverages DMRS(s) from frequency PDSCH communication(s) domain duplexed (FDMed) with a PDSCH intended for the UE to construct virtual pilots. In certain aspects, the DMRS(s) leveraged by the UE are from FDMed PDSCH communications(s) scheduled for the UE. In certain aspects, the DMRS(s) leveraged by the UE are from FDMed PDSCH communication(s) scheduled for one or more other UEs.

Figure 13:
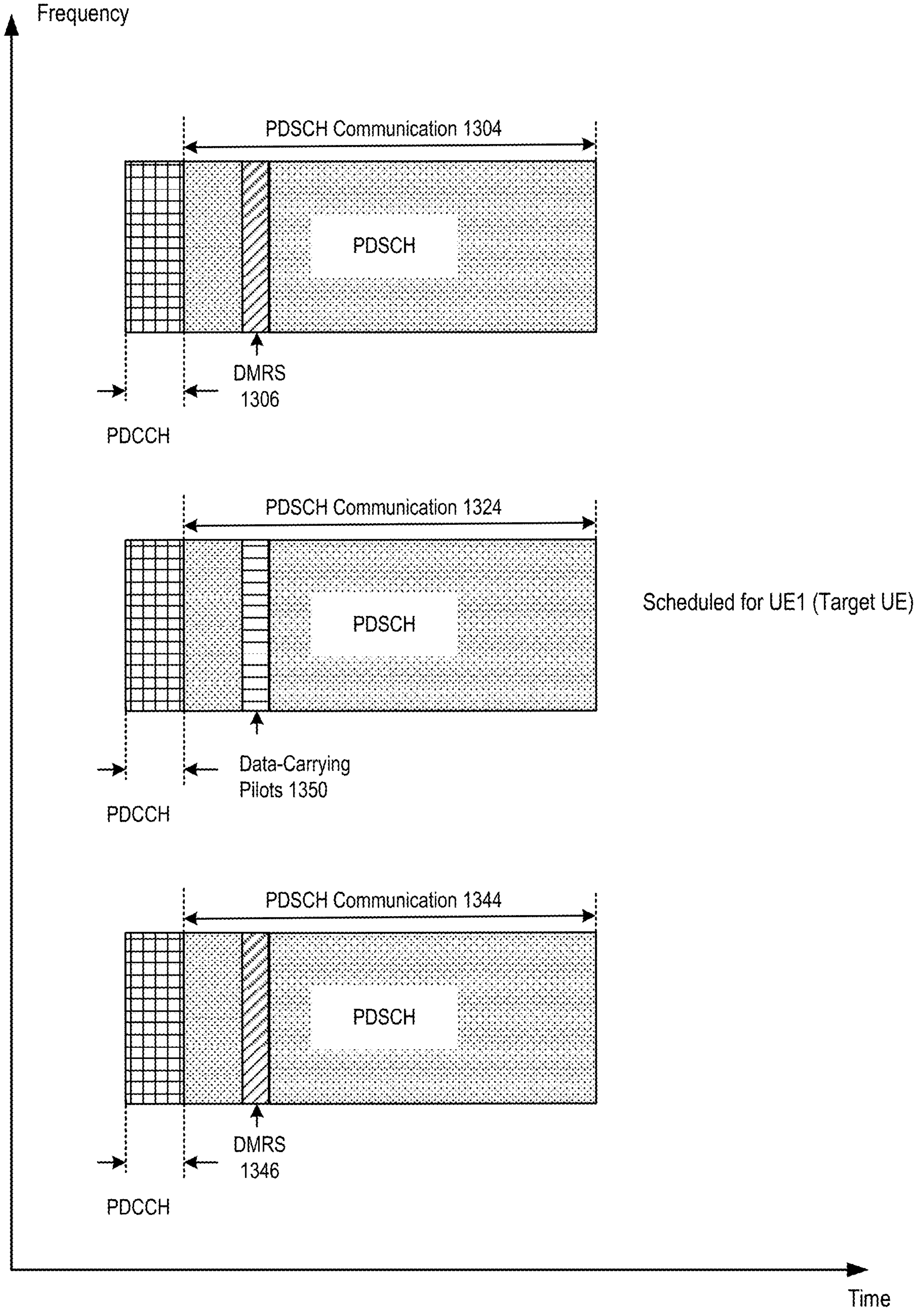
FIG. 13 depicts example DMRS sharing in the frequency domain for virtual pilot construction.

Example DMRS sharing in the frequency domain for virtual pilot construction is depicted in FIG. 13. As shown, (1) a PDSCH communication 1304 is scheduled in a first set of frequency resources, (2) a PDSCH communication 1324 is scheduled in a second set of frequency resources, and (3) a PDSCH communication 1344 is scheduled in a third set of frequency resources (e.g., all aligned in time). In certain aspects, PDSCH communications 1304, 1324, and 1344 are scheduled for a single UE, such as UE1 in this example. In certain other aspects, PDSCH communications 1304, 1324, and 1344 are scheduled for different UEs. For example, PDSCH communication 1324 may be scheduled for UE1; however, PDSCH communication 1304 and/or PDSCH communication 1344 may be scheduled for a different UE. UE1 and/or other UE(s) may each be example(s) of UE 104 depicted and described with respect to FIGS. 1 and 3.

DMRS(s) 1306 may be scheduled in one symbol in PDSCH communication 1304. DMRS(s) 1346 may be scheduled in one symbol in PDSCH communication 1344. No DMRSs may be scheduled in PDSCH communication 1324; however, data-carrying pilot(s) 1350 may be scheduled in one symbol in PDSCH communication 1324. Although one DMRS symbol is scheduled in PDSCH communication 1304, one DMRS symbol is scheduled in PDSCH communication 1344, and data-carrying pilot(s) are scheduled in one symbol in PDSCH communication 1324, as shown in FIG. 13, in some other examples, more or less DMRS symbols and/or data-carrying pilot symbols may be scheduled (as long as the DMRS symbols align in time with the data-carrying pilot symbols).

In this example, UE1 may be a target UE, or a UE intended to utilize buffered DMRS information to demodulate and/or decode data-carrying pilot(s) 1350 in PDSCH communication 1324 to construct virtual pilot(s) for the performance of channel estimation. For example, UE1 may be a UE capable of constructing virtual pilot(s) from data-carrying pilot(s) 1350.

UE1 may buffer DMRS information for (1) DMRS(s) 1306 included in PDSCH communication 1304 and/or for (2) DMRS(s) 1346 included in PDSCH communication 1344. The DMRS information associated with DMRS(s) 1306, 1326, and buffered by UE1 may include a first channel estimate associated with DMRS(s) 1306 and a second channel estimate associated with DMRS(s) 1346. UE1 may utilize this buffered information to demodulate and/or decode data-carrying pilot(s) 1350 in PDSCH communication 1324. For example, UE1 may derive a channel estimate for the symbol location of data-carrying pilot(s) 1350 in PDSCH communication 1324 by frequency domain combining (e.g., interpolating) the buffered channel estimate associated with DMRS(s) 1306 in PDSCH communication 1304 and the buffered channel estimate associated with DMRS(s) 1346 in PDSCH communication 1344. UE1 may use this derived channel estimate to demodulate and/or decode data-carrying pilot(s) 1350 to construct virtual pilot(s) for performance of channel estimation. It is noted that a requirement of performing the frequency domain combining (e.g., interpolating) to derive the channel estimate is that the FDRA for PDSCH communication 1324 is between the FDRAs of PDSCH communication 1304 and PDSCH communication 1344.

In certain aspects, to enable UE1 to buffer DMRS information for demodulating and/or decoding data-carrying pilot(s) 1350 in PDSCH communication 1344, UE1 may receive an indication to utilize one or more DMRSs from PDSCH communication 1304 and PDSCH communication 1344. In certain aspects (e.g. a first option), the indication to utilize the DMRS(s) is received, at UE1, in a GC-DCI intended for a group of UEs that includes UE1. In certain aspects (e.g. a second option), the indication to utilize the DMRS(s) is received, at UE1, in a UE-specific DCI intended for UE1. In FIG. 13, the GC-DCI or the UE-specific DCI may be sent in the PDCCHs scheduling PDSCH communications 1034, 1324, and 1344.

In certain aspects, UE1 may receive an indication of one or more common configurations for communication of DMRS(s) 1306 in PDSCH communication 1304 and DMRS(s) 1346 in PDSCH communication 1344. The common configurations used for communication of DMRS(s) 1306 and DMRS(s) 1346 may include: a time domain position of the DMRS(s), a DMRS configuration type, a PRG size, a precoder type, and/or a DMRS scrambling identity (e.g., DMRS scrambling ID0 or ID1). In certain aspects, DMRS(s) 1306 and/or DMRS(s) 1346 may be precoded as indicated via the common configurations such that UE1 is able to demodulate data-carrying pilot(s) 1350.

In certain aspects, UE1 may receive an indication of a location of DMRS(s) 1306 in PDSCH communication 1304 and a location of DMRS(s) 1346 in PDSCH communication 1344. This indication may enable UE to locate the DMRS(s) 1306, 1346 for channel estimation and buffering.

In certain aspects, UE1 may receive an indication of an FDRA associated with one or more groups of UEs. For example, UE1 may receive an indication of the FDRA for different FDMed UEs for virtual pilot construction.

In certain aspects, UE1 may indicate, to a network entity scheduling PDSCH communications 1304, 1324, and 1344, a maximum number of channel estimates, each associated with a PRG, that UE1 is able to store for virtual pilot(s) construction (e.g., indicate a maximum number of PRGs for which UE1 is able to store channel estimation information). In certain aspects, UE1 indicates this information via RRC signaling. For example, each PDSCH communication FDMed with a PDSCH carrying data-carrying pilots and intended for UE1 may be associated with one or more PRGs. UE1 may store channel estimates from each of these FDMed PDSCHs to perform cross PRG combining to derive a virtual pilot.

Example Operations

Figure 14:
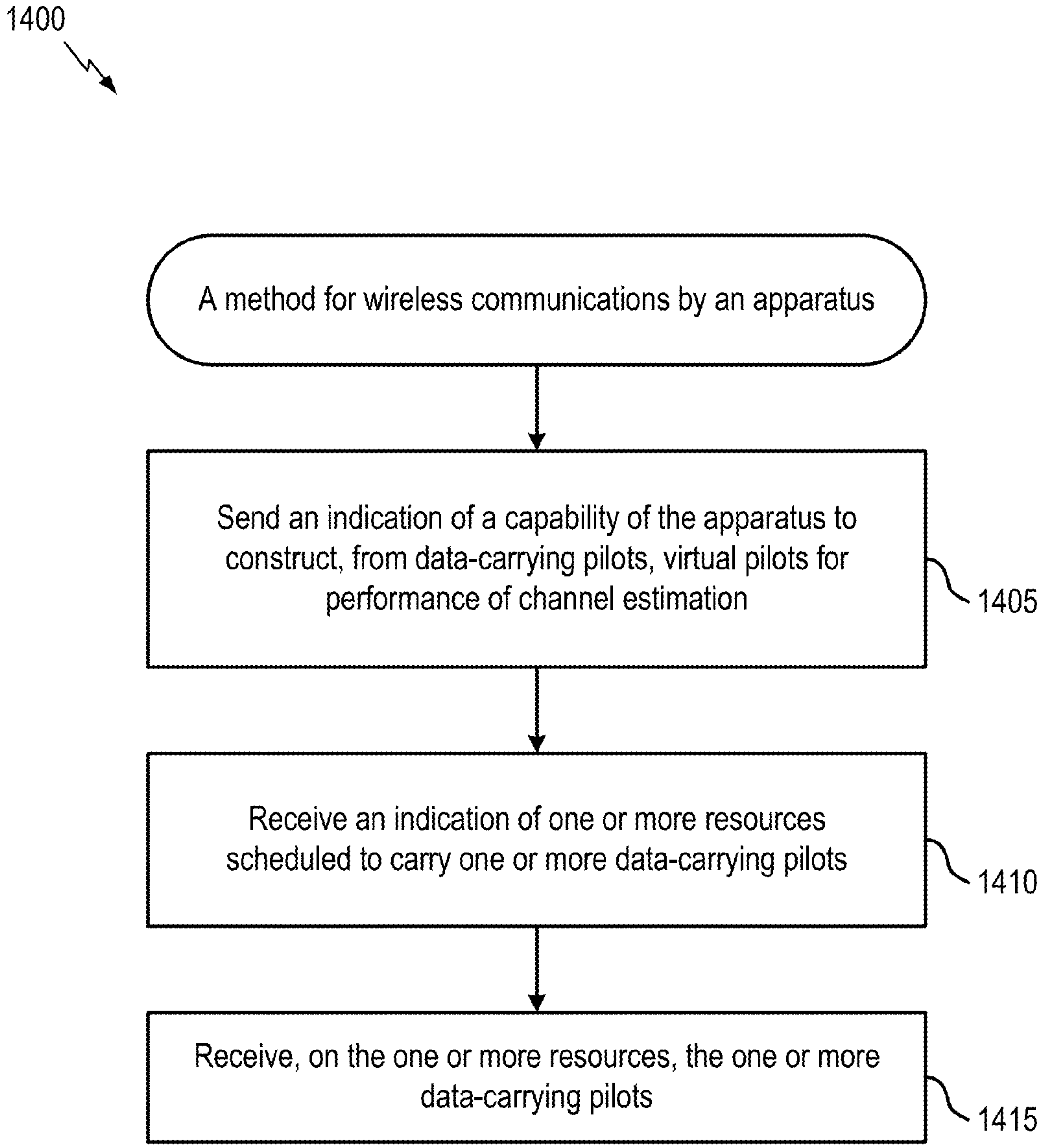
FIG. 14 depicts a method for wireless communications.

FIG. 14 shows a method 1400 for wireless communications by an apparatus, such as UE 104 of FIGS. 1 and 3.

Method 1400 begins at block 1405 with sending an indication of a capability of the apparatus to construct, from data-carrying pilots, virtual pilots for performance of channel estimation.

Method 1400 then proceeds to block 1410 with receiving an indication of one or more resources scheduled to carry one or more data-carrying pilots.

Method 1400 then proceeds to block 1415 with receiving, on the one or more resources, the one or more data-carrying pilots.

In certain aspects, block 1405 includes sending one or more indications of capability information of the apparatus related to construction of virtual pilots, the capability information comprising one or more of: a Doppler spread threshold; a delay spread threshold; a threshold number of RBs; a maximum number of data-carrying pilots per time period; or support for data-carrying pilots under virtual RB to physical RB interleaving.

In certain aspects, block 1405 includes sending one or more indications of capability information of the apparatus related to construction of virtual pilots, the capability information comprising: a minimum duration after reception of a data-carrying pilot for the apparatus to determine a channel estimate based on the data-carrying pilot.

In certain aspects, block 1405 includes sending one or more indications of capability information of the apparatus related to construction of virtual pilots, the capability information comprising: a maximum duration between scheduling of 1) a DMRS and 2) a data-carrying pilot.

In certain aspects, method 1400 further includes communicating an indication of one or more of a reliability measure or a reliability threshold for determination of the maximum duration.

In certain aspects, block 1405 includes sending one or more indications of capability information of the apparatus related to construction of virtual pilots, the capability information comprising: a category of the apparatus among a plurality of categories associated with a plurality of capabilities for constructing virtual pilots from data-carrying pilots.

In certain aspects, method 1400 further includes receiving a transmission comprising a first number of DMRSs.

In certain aspects, method 1400 further includes transmitting a negative acknowledgment with respect to the transmission based on a failure to decode the transmission.

In certain aspects, method 1400 further includes receiving a retransmission of the transmission, the retransmission comprising a second number of DMRSs, wherein the second number is greater than the first number.

In certain aspects, the one or more resources occur during a first time interval; and the method 1400 further comprises: receiving an indication to utilize one or more DMRSs from one or more time intervals prior to the first time interval to construct one or more virtual pilots based on the one or more data-carrying pilots.

In certain aspects, the one or more DMRSs are scheduled for the apparatus or for one or more user equipments.

In certain aspects, receiving the indication to utilize the one or more DMRSs comprises receiving the indication to utilize the one or more DMRSs in a group common downlink control information comprising a cyclic redundancy check scrambled with a common radio network temporary identifier for a group of user equipments including the apparatus.

In certain aspects, receiving the indication to utilize the one or more DMRSs comprises receiving the indication to utilize the one or more DMRSs in a user equipment specific downlink control information comprising a cyclic redundancy check scrambled with a cell radio network temporary identifier of the apparatus.

In certain aspects, method 1400 further includes receiving an indication of one or more common configurations for communication of DMRSs common to the first time interval and the one or more time intervals, the one or more common configurations comprising one or more of: a frequency domain resource allocation; a DMRS configuration type; a precoding resource block group size; a precoder type; or a DMRS scrambling identity.

In certain aspects, method 1400 further includes receiving an indication of a location of each of the one or more DMRSs from one or more time intervals prior to the first time interval.

In certain aspects, block 1405 includes sending one or more indications of capability information of the apparatus related to construction of virtual pilots, the capability information comprising: a maximum number of the one or more DMRSs the apparatus can store prior to constructing the virtual pilots for the performance of the channel estimation.

In certain aspects, method 1400 further includes receiving an indication to utilize one or more DMRSs from one or more other resources frequency division multiplexed with the one or more resources to construct one or more virtual pilots based on the one or more data-carrying pilots.

In certain aspects, the one or more DMRSs are scheduled for the apparatus or for one or more user equipments.

In certain aspects, the one or more DMRSs are scheduled for the one or more user equipments; and the method 1400 further comprises: receiving an indication of a frequency domain resource allocation for each of the one or more user equipments.

In certain aspects, receiving the indication to utilize the one or more DMRSs comprises receiving the indication to utilize the one or more DMRSs in a group common downlink control information comprising a cyclic redundancy check scrambled with a common radio network temporary identifier for a group of user equipments including the apparatus.

In certain aspects, receiving the indication to utilize the one or more DMRSs comprises receiving the indication to utilize the one or more DMRSs in a user equipment specific downlink control information comprising a cyclic redundancy check scrambled with a cell radio network temporary identifier of the apparatus.

In certain aspects, method 1400 further includes receiving an indication of one or more common configurations for communication of DMRSs common to the one or more resources and the one or more other resources, the one or more common configurations comprising one or more of: a time domain position of the DMRSs; a DMRS configuration type; a precoding resource block group size; a precoder type; or a DMRS scrambling identity.

In certain aspects, block 1405 includes sending one or more indications of capability information of the apparatus related to construction of virtual pilots, the capability information comprising: a maximum number of PRGs the apparatus can store prior to constructing the virtual pilots for the performance of the channel estimation.

In certain aspects, method 1400 further includes receiving an indication of one or more uplink resources scheduled to carry one or more uplink data-carrying pilots.

In certain aspects, method 1400 further includes sending, on the one or more uplink resources, the one or more uplink data-carrying pilots.

In certain aspects, method 1400 further includes determining a channel estimate based at least in part on the one or more data-carrying pilots.

In certain aspects, method 1400 further includes receiving a data signal.

In certain aspects, method 1400 further includes decoding the data signal based on the channel estimate.

Figure 16:
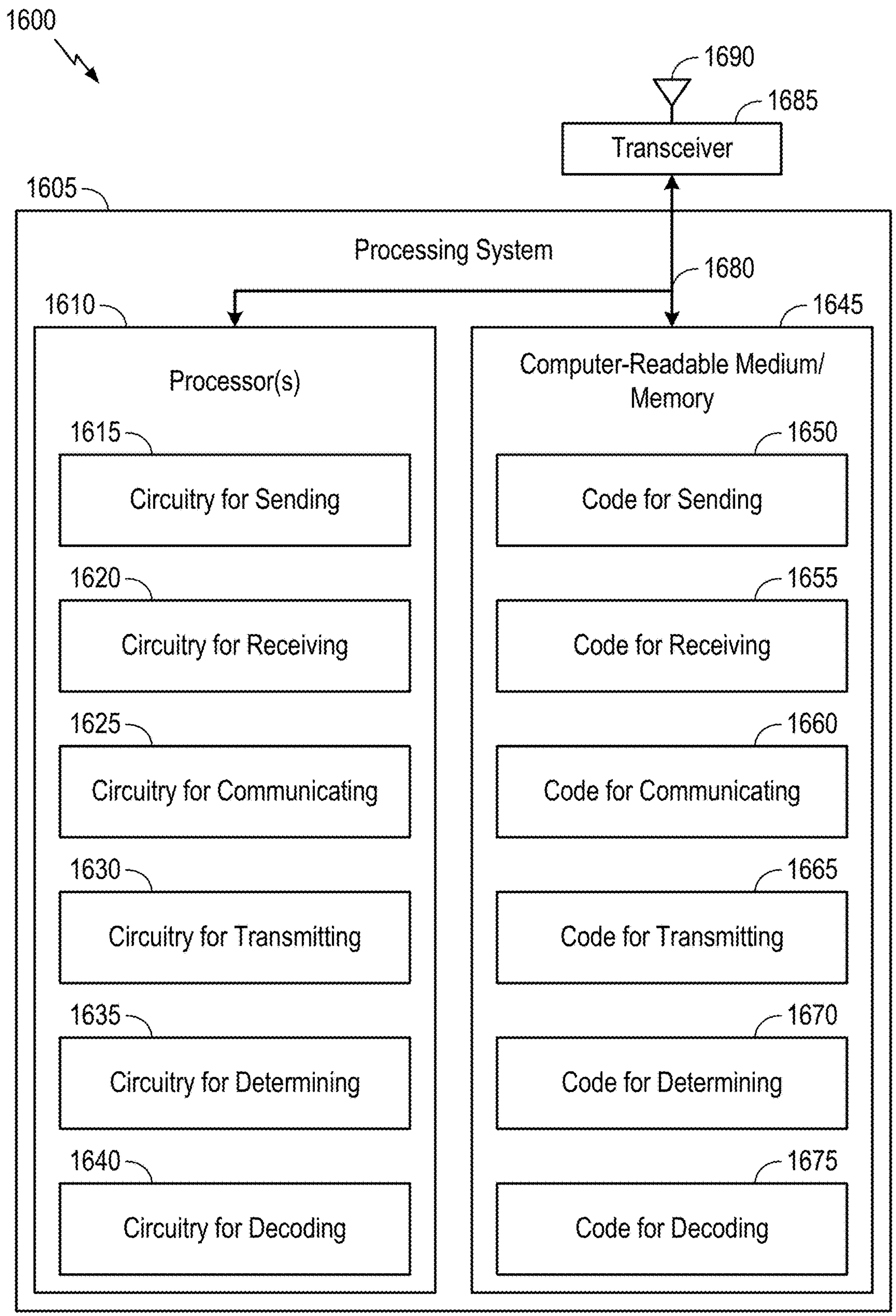
FIG. 16 depicts aspects of an example communications device.

In certain aspects, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative operations are possible consistent with this disclosure.

Figure 15:
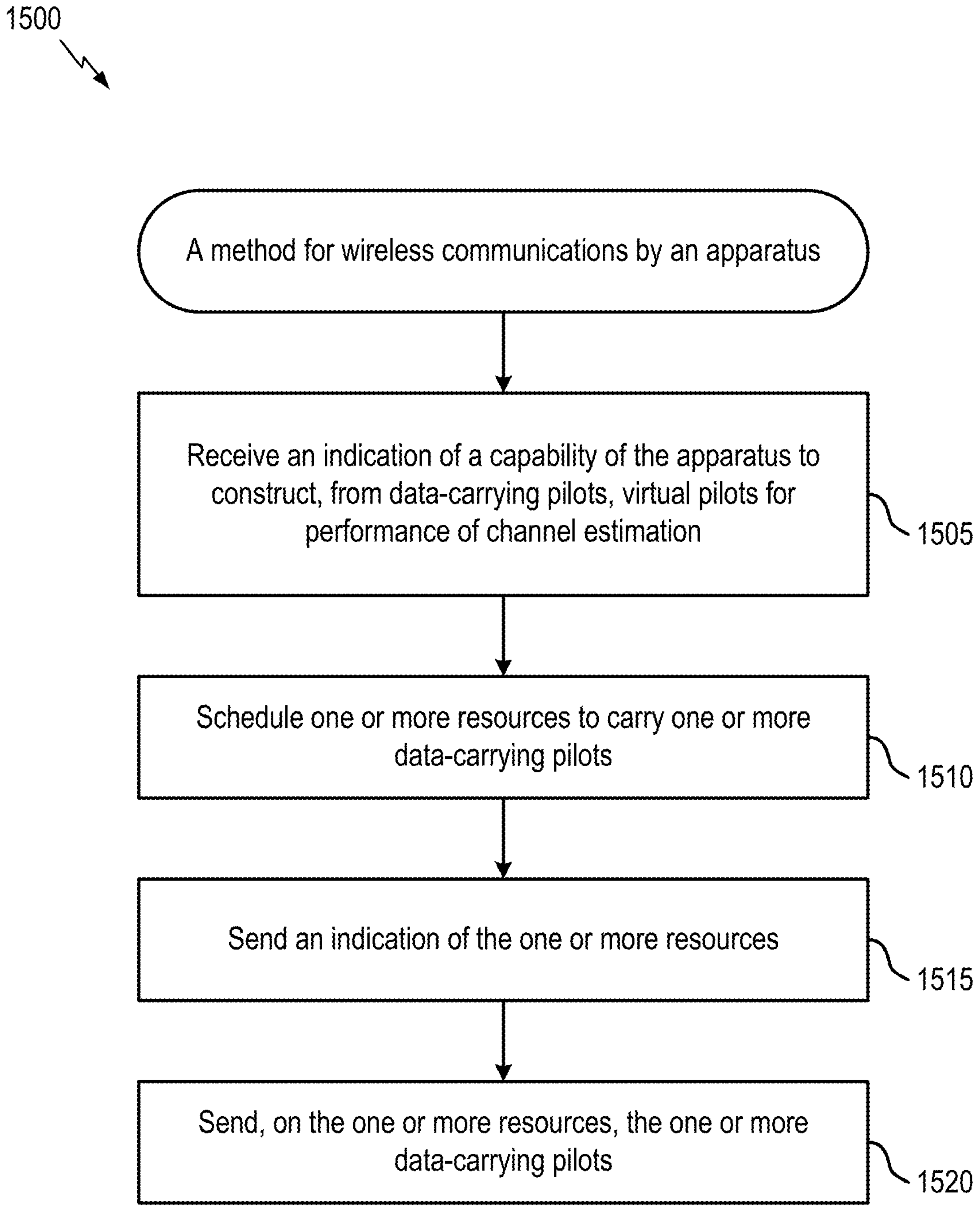
FIG. 15 depicts another method for wireless communications.

FIG. 15 shows a method 1500 for wireless communications by an apparatus, such as BS 102 of FIGS. 1 and 3, or a disaggregated base station as discussed with respect to FIG. 2.

Method 1500 begins at block 1505 with receiving an indication of a capability of the apparatus to construct, from data-carrying pilots, virtual pilots for performance of channel estimation.

Method 1500 then proceeds to block 1510 with scheduling one or more resources to carry one or more data-carrying pilots.

Method 1500 then proceeds to block 1515 with sending an indication of the one or more resources.

Method 1500 then proceeds to block 1520 with sending, on the one or more resources, the one or more data-carrying pilots.

In certain aspects, block 1505 includes receiving one or more indications of capability information of a user equipment related to construction of virtual pilots, the capability information comprising one or more of: a Doppler spread threshold; a delay spread threshold; a threshold number of RBs; a maximum number of data-carrying pilots per time period; or support for data-carrying pilots under virtual RB to physical RB interleaving.

In certain aspects, block 1505 includes receiving one or more indications of capability information of a user equipment related to construction of virtual pilots, the capability information comprising: a minimum duration after reception of a data-carrying pilot for the user equipment to determine a channel estimate based on the data-carrying pilot.

In certain aspects, block 1505 includes receiving one or more indications of capability information of a user equipment related to construction of virtual pilots, the capability information comprising: a maximum duration between scheduling of 1) a DMRS and 2) a data-carrying pilot.

In certain aspects, method 1500 further includes communicating an indication of one or more of a reliability measure or a reliability threshold for determination of the maximum duration.

In certain aspects, block 1505 includes receiving one or more indications of capability information of a user equipment related to construction of virtual pilots, the capability information comprising: a category of the user equipment among a plurality of categories associated with a plurality of capabilities for constructing virtual pilots from data-carrying pilots.

In certain aspects, method 1500 further includes sending a transmission comprising a first number of DMRSs.

In certain aspects, method 1500 further includes receiving a negative acknowledgment with respect to the transmission.

In certain aspects, method 1500 further includes sending a retransmission of the transmission, the retransmission comprising a second number of DMRSs, wherein the second number is greater than the first number.

In certain aspects, the one or more resources occur during a first time interval; and the method 1500 further comprises: sending an indication to utilize one or more DMRSs from one or more time intervals prior to the first time interval to construct one or more virtual pilots based on the one or more data-carrying pilots.

In certain aspects, the one or more DMRSs are scheduled for one or more user equipments.

In certain aspects, sending the indication to utilize the one or more DMRSs comprises sending the indication to utilize the one or more DMRSs in a group common downlink control information comprising a cyclic redundancy check scrambled with a common radio network temporary identifier for a group of user equipments.

In certain aspects, sending the indication to utilize the one or more DMRSs comprises sending the indication to utilize the one or more DMRSs in a user equipment specific downlink control information comprising a cyclic redundancy check scrambled with a cell radio network temporary identifier of a user equipment.

In certain aspects, method 1500 further includes sending an indication of one or more common configurations for communication of DMRSs common to the first time interval and the one or more time intervals, the one or more common configurations comprising one or more of: a frequency domain resource allocation; a DMRS configuration type; a precoding resource block group size; a precoder type; or a DMRS scrambling identity.

In certain aspects, method 1500 further includes sending an indication of a location of each of the one or more DMRSs from one or more time intervals prior to the first time interval.

In certain aspects, block 1505 includes receiving one or more indications of capability information of a user equipment related to construction of virtual pilots, the capability information comprising: a maximum number of the one or more DMRSs the user equipment can store prior to constructing the virtual pilots for the performance of the channel estimation.

In certain aspects, method 1500 further includes sending an indication to utilize one or more DMRSs from one or more other resources frequency division multiplexed with the one or more resources to construct one or more virtual pilots based on the one or more data-carrying pilots.

In certain aspects, the one or more DMRSs are scheduled for one or more user equipments.

In certain aspects, method 1500 further includes sending an indication of a frequency domain resource allocation for each of the one or more user equipments.

In certain aspects, sending the indication to utilize the one or more DMRSs comprises sending the indication to utilize the one or more DMRSs in a group common downlink control information comprising a cyclic redundancy check scrambled with a common radio network temporary identifier for a group of user equipments.

In certain aspects, sending the indication to utilize the one or more DMRSs comprises sending the indication to utilize the one or more DMRSs in a user equipment specific downlink control information comprising a cyclic redundancy check scrambled with a cell radio network temporary identifier of a user equipment.

In certain aspects, method 1500 further includes sending an indication of one or more common configurations for communication of DMRSs common to the one or more resources and the one or more other resources, the one or more common configurations comprising one or more of: a time domain position of the DMRSs; a DMRS configuration type; a precoding resource block group size; a precoder type; or a DMRS scrambling identity.

In certain aspects, block 1505 includes receiving one or more indications of capability information of a user equipment related to construction of virtual pilots, the capability information comprising: a maximum number of PRGs the user equipment can store prior to constructing the virtual pilots for the performance of the channel estimation.

In certain aspects, method 1500 further includes sending an indication of one or more uplink resources scheduled to carry one or more uplink data-carrying pilots.

In certain aspects, method 1500 further includes receiving, on the one or more uplink resources, the one or more uplink data-carrying pilots.

In certain aspects, method 1500 further includes determining a channel estimate based at least in part on the one or more uplink data-carrying pilots.

In certain aspects, method 1500 further includes receiving a data signal.

In certain aspects, method 1500 further includes decoding the data signal based on the channel estimate.

Figure 17:
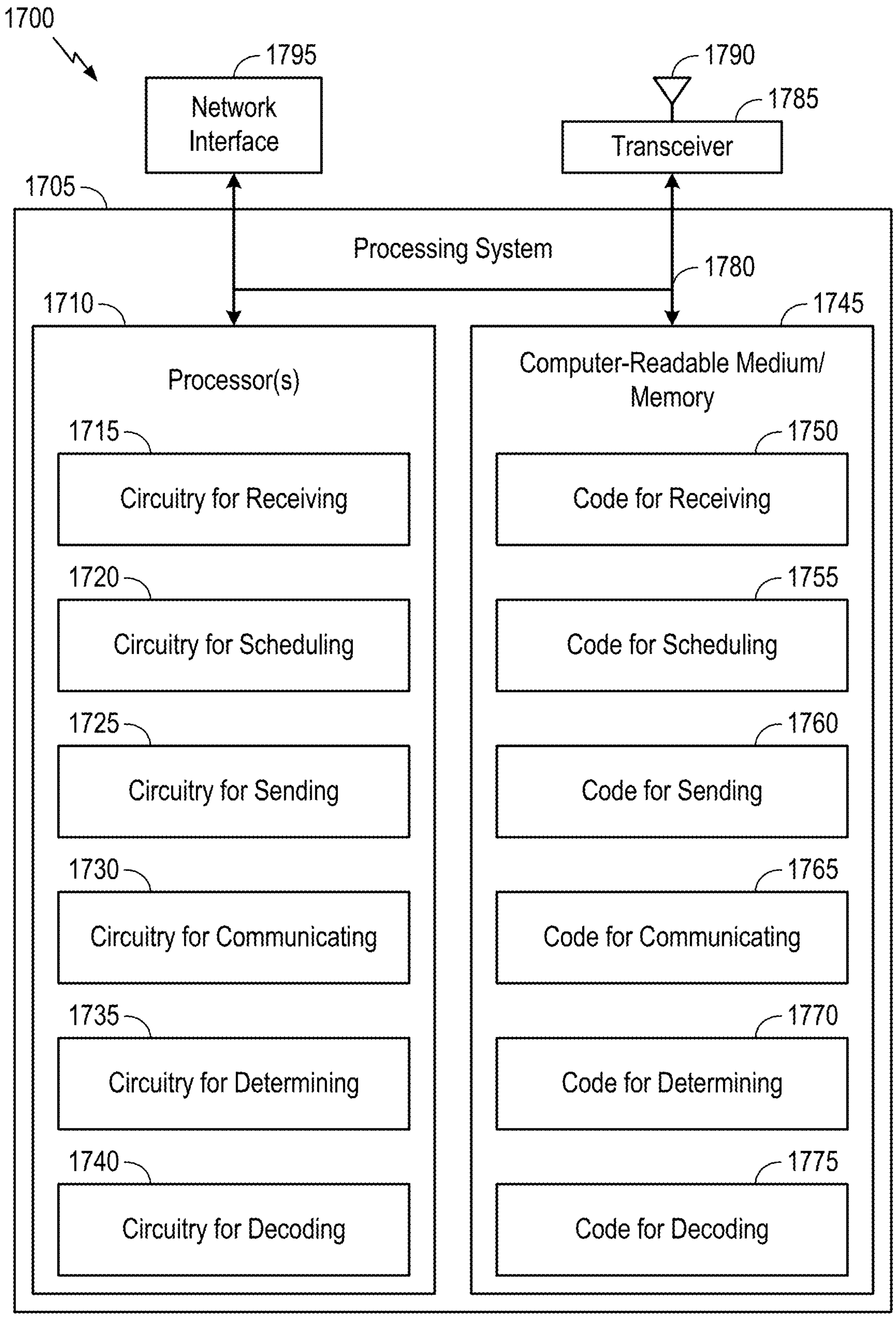
FIG. 17 depicts aspects of an example communications device.

In certain aspects, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative operations are possible consistent with this disclosure.

Example Communications Devices

FIG. 16 depicts aspects of an example communications device 1600. In some aspects, communications device 1600 is a user equipment, such as UE 104 described above with respect to FIGS. 1 and 3.

The communications device 1600 includes a processing system 1605 coupled to a transceiver 1685 (e.g., a transmitter and/or a receiver). The transceiver 1685 is configured to transmit and receive signals for the communications device 1600 via an antenna 1690, such as the various signals as described herein. The processing system 1605 may be configured to perform processing functions for the communications device 1600, including processing signals received and/or to be transmitted by the communications device 1600.

The processing system 1605 includes one or more processors 1610. In various aspects, the one or more processors 1610 may be representative of one or more of receive processor 358, transmit processor 364, TX MIMO processor 366, and/or controller/processor 380, as described with respect to FIG. 3. The one or more processors 1610 are coupled to a computer-readable medium/memory 1645 via a bus 1680. In certain aspects, the computer-readable medium/memory 1645 is configured to store instructions (e.g., computer-executable code) that when executed by the one or more processors 1610, enable and cause the one or more processors 1610 to perform the method 1400 described with respect to FIG. 14, or any aspect related to it, including any operations described in relation to FIG. 14. Note that reference to a processor performing a function of communications device 1600 may include one or more processors performing that function of communications device 1600, such as in a distributed fashion.

In the depicted example, computer-readable medium/memory 1645 stores code for sending 1650, code for receiving 1655, code for communicating 1660, code for transmitting 1665, code for determining 1670, and code for decoding 1675. Processing of the code 1650-1675 may enable and cause the communications device 1600 to perform the method 1400 described with respect to FIG. 14, or any aspect related to it.

The one or more processors 1610 include circuitry configured to implement (e.g., execute) the code stored in the computer-readable medium/memory 1645, including circuitry for sending 1615, circuitry for receiving 1620, circuitry for communicating 1625, circuitry for transmitting 1630, circuitry for determining 1635, and circuitry for decoding 1640. Processing with circuitry 1615-1640 may enable and cause the communications device 1600 to perform the method 1400 described with respect to FIG. 14, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1685 and/or antenna 1690 of the communications device 1600 in FIG. 16, and/or one or more processors 1610 of the communications device 1600 in FIG. 16. Means for communicating, receiving or obtaining may include the transceivers 354, antenna(s) 352, receive processor 358, AI processor 370, and/or controller/processor 380 of the UE 104 illustrated in FIG. 3, transceiver 1685 and/or antenna 1690 of the communications device 1600 in FIG. 16, and/or one or more processors 1610 of the communications device 1600 in FIG. 16.

FIG. 17 depicts aspects of an example communications device 1700. In some aspects, communications device 1700 is a network entity, such as BS 102 of FIGS. 1 and 3, or a disaggregated base station as discussed with respect to FIG. 2.

The communications device 1700 includes a processing system 1705 coupled to a transceiver 1785 (e.g., a transmitter and/or a receiver) and/or a network interface 1795. The transceiver 1785 is configured to transmit and receive signals for the communications device 1700 via an antenna 1790, such as the various signals as described herein. The network interface 1795 is configured to obtain and send signals for the communications device 1700 via communications link(s), such as a backhaul link, midhaul link, and/or fronthaul link as described herein, such as with respect to FIG. 2. The processing system 1705 may be configured to perform processing functions for the communications device 1700, including processing signals received and/or to be transmitted by the communications device 1700.

The processing system 1705 includes one or more processors 1710. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1745 via a bus 1780. In certain aspects, the computer-readable medium/memory 1745 is configured to store instructions (e.g., computer-executable code) that when executed by the one or more processors 1710, enable and cause the one or more processors 1710 to perform the method 1500 described with respect to FIG. 15, or any aspect related to it, including any operations described in relation to FIG. 15. Note that reference to a processor of communications device 1700 performing a function may include one or more processors of communications device 1700 performing that function, such as in a distributed fashion.

In the depicted example, the computer-readable medium/memory 1745 stores code for receiving 1750, code for scheduling 1755, code for sending 1760, code for communicating 1765, code for determining 1770, and code for decoding 1775. Processing of the code 1750-1775 may enable and cause the communications device 1700 to perform the method 1500 described with respect to FIG. 15, or any aspect related to it.

The one or more processors 1710 include circuitry configured to implement (e.g., execute) the code stored in the computer-readable medium/memory 1745, including circuitry for receiving 1715, circuitry for scheduling 1720, circuitry for sending 1725, circuitry for communicating 1730, circuitry for determining 1735, and circuitry for decoding 1740. Processing with circuitry 1715-1740 may enable and cause the communications device 1700 to perform the method 1500 described with respect to FIG. 15, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1785, antenna 1790, and/or network interface 1795 of the communications device 1700 in FIG. 17, and/or one or more processors 1710 of the communications device 1700 in FIG. 17. Means for communicating, receiving or obtaining may include the transceivers 332, antenna(s) 334, receive processor 338, AI processor 318, and/or controller/processor 340 of the BS 102 illustrated in FIG. 3, transceiver 1785, antenna 1790, and/or network interface 1795 of the communications device 1700 in FIG. 17, and/or one or more processors 1710 of the communications device 1700 in FIG. 17.

Example Clauses

Implementation examples are described in the following numbered clauses:

Clause 1: A method for wireless communications by an apparatus comprising: sending an indication of a capability of the apparatus to construct, from data-carrying pilots, virtual pilots for performance of channel estimation; receiving an indication of one or more resources scheduled to carry one or more data-carrying pilots; and receiving, on the one or more resources, the one or more data-carrying pilots.

Clause 2: The method of Clause 1, wherein sending the indication of the capability comprises sending one or more indications of capability information of the apparatus related to construction of virtual pilots, the capability information comprising one or more of: a Doppler spread threshold; a delay spread threshold; a threshold number of RBs; a maximum number of data-carrying pilots per time period; or support for data-carrying pilots under virtual RB to physical RB interleaving.

Clause 3: The method of any one of Clauses 1-2, wherein sending the indication of the capability comprises sending one or more indications of capability information of the apparatus related to construction of virtual pilots, the capability information comprising: a minimum duration after reception of a data-carrying pilot for the apparatus to determine a channel estimate based on the data-carrying pilot.

Clause 4: The method of any one of Clauses 1-3, wherein sending the indication of the capability comprises sending one or more indications of capability information of the apparatus related to construction of virtual pilots, the capability information comprising: a maximum duration between scheduling of 1) a DMRS and 2) a data-carrying pilot.

Clause 5: The method of Clause 4, further comprising: communicating an indication of one or more of a reliability measure or a reliability threshold for determination of the maximum duration.

Clause 6: The method of any one of Clauses 1-5, wherein sending the indication of the capability comprises sending one or more indications of capability information of the apparatus related to construction of virtual pilots, the capability information comprising: a category of the apparatus among a plurality of categories associated with a plurality of capabilities for constructing virtual pilots from data-carrying pilots.

Clause 7: The method of any one of Clauses 1-6, further comprising: receiving a transmission comprising a first number of DMRSs; transmitting a negative acknowledgment with respect to the transmission based on a failure to decode the transmission; and receiving a retransmission of the transmission, the retransmission comprising a second number of DMRSs, wherein the second number is greater than the first number.

Clause 8: The method of any one of Clauses 1-7, wherein: the one or more resources occur during a first time interval; and the method further comprises: receiving an indication to utilize one or more DMRSs from one or more time intervals prior to the first time interval to construct one or more virtual pilots based on the one or more data-carrying pilots.

Clause 9: The method of Clause 8, wherein the one or more DMRSs are scheduled for the apparatus or for one or more user equipments.

Clause 10: The method of Clause 8, wherein receiving the indication to utilize the one or more DMRSs comprises receiving the indication to utilize the one or more DMRSs in a group common downlink control information comprising a cyclic redundancy check scrambled with a common radio network temporary identifier for a group of user equipments including the apparatus.

Clause 11: The method of Clause 8, wherein receiving the indication to utilize the one or more DMRSs comprises receiving the indication to utilize the one or more DMRSs in a user equipment specific downlink control information comprising a cyclic redundancy check scrambled with a cell radio network temporary identifier of the apparatus.

Clause 12: The method of Clause 8, further comprising: receiving an indication of one or more common configurations for communication of DMRSs common to the first time interval and the one or more time intervals, the one or more common configurations comprising one or more of: a frequency domain resource allocation; a DMRS configuration type; a precoding resource block group size; a precoder type; or a DMRS scrambling identity.

Clause 13: The method of Clause 8, further comprising: receiving an indication of a location of each of the one or more DMRSs from one or more time intervals prior to the first time interval.

Clause 14: The method of Clause 8, wherein sending the indication of the capability comprises sending one or more indications of capability information of the apparatus related to construction of virtual pilots, the capability information comprising: a maximum number of the one or more DMRSs the apparatus can store prior to constructing the virtual pilots for the performance of the channel estimation.

Clause 15: The method of any one of Clauses 1-14, further comprising: receiving an indication to utilize one or more DMRSs from one or more other resources frequency division multiplexed with the one or more resources to construct one or more virtual pilots based on the one or more data-carrying pilots.

Clause 16: The method of Clause 15, wherein the one or more DMRSs are scheduled for the apparatus or for one or more user equipments.

Clause 17: The method of Clause 16, wherein: the one or more DMRSs are scheduled for the one or more user equipments; and the method further comprises: receiving an indication of a frequency domain resource allocation for each of the one or more user equipments.

Clause 18: The method of Clause 15, wherein receiving the indication to utilize the one or more DMRSs comprises receiving the indication to utilize the one or more DMRSs in a group common downlink control information comprising a cyclic redundancy check scrambled with a common radio network temporary identifier for a group of user equipments including the apparatus.

Clause 19: The method of Clause 15, wherein receiving the indication to utilize the one or more DMRSs comprises receiving the indication to utilize the one or more DMRSs in a user equipment specific downlink control information comprising a cyclic redundancy check scrambled with a cell radio network temporary identifier of the apparatus.

Clause 20: The method of Clause 15, further comprising: receiving an indication of one or more common configurations for communication of DMRSs common to the one or more resources and the one or more other resources, the one or more common configurations comprising one or more of: a time domain position of the DMRSs; a DMRS configuration type; a precoding resource block group size; a precoder type; or a DMRS scrambling identity.

Clause 21: The method of Clause 15, wherein sending the indication of the capability comprises sending one or more indications of capability information of the apparatus related to construction of virtual pilots, the capability information comprising: a maximum number of PRGs the apparatus can store prior to constructing the virtual pilots for the performance of the channel estimation.

Clause 22: The method of any one of Clauses 1-21, further comprising: receiving an indication of one or more uplink resources scheduled to carry one or more uplink data-carrying pilots; and sending, on the one or more uplink resources, the one or more uplink data-carrying pilots.

Clause 23: The method of any one of Clauses 1-22, further comprising: determining a channel estimate based at least in part on the one or more data-carrying pilots.

Clause 24: The method of Clause 23, further comprising: receiving a data signal; and decoding the data signal based on the channel estimate.

Clause 25: A method for wireless communications by an apparatus comprising: receiving an indication of a capability of the apparatus to construct, from data-carrying pilots, virtual pilots for performance of channel estimation; scheduling one or more resources to carry one or more data-carrying pilots; sending an indication of the one or more resources; and sending, on the one or more resources, the one or more data-carrying pilots.

Clause 26: The method of Clause 25, wherein receiving the indication of the capability comprises receiving one or more indications of capability information of a user equipment related to construction of virtual pilots, the capability information comprising one or more of: a Doppler spread threshold; a delay spread threshold; a threshold number of RBs; a maximum number of data-carrying pilots per time period; or support for data-carrying pilots under virtual RB to physical RB interleaving.

Clause 27: The method of any one of Clauses 25-26, wherein receiving the indication of the capability comprises receiving one or more indications of capability information of a user equipment related to construction of virtual pilots, the capability information comprising: a minimum duration after reception of a data-carrying pilot for the user equipment to determine a channel estimate based on the data-carrying pilot.

Clause 28: The method of any one of Clauses 25-27, wherein receiving the indication of the capability comprises receiving one or more indications of capability information of a user equipment related to construction of virtual pilots, the capability information comprising: a maximum duration between scheduling of 1) a DMRS and 2) a data-carrying pilot.

Clause 29: The method of Clause 28, further comprising: communicating an indication of one or more of a reliability measure or a reliability threshold for determination of the maximum duration.

Clause 30: The method of any one of Clauses 25-29, wherein receiving the indication of the capability comprises receiving one or more indications of capability information of a user equipment related to construction of virtual pilots, the capability information comprising: a category of the user equipment among a plurality of categories associated with a plurality of capabilities for constructing virtual pilots from data-carrying pilots.

Clause 31: The method of any one of Clauses 25-30, further comprising: sending a transmission comprising a first number of DMRSs; receiving a negative acknowledgment with respect to the transmission; and sending a retransmission of the transmission, the retransmission comprising a second number of DMRSs, wherein the second number is greater than the first number.

Clause 32: The method of any one of Clauses 25-31, wherein: the one or more resources occur during a first time interval; and the method further comprises: sending an indication to utilize one or more DMRSs from one or more time intervals prior to the first time interval to construct one or more virtual pilots based on the one or more data-carrying pilots.

Clause 33: The method of Clause 32, wherein the one or more DMRSs are scheduled for one or more user equipments.

Clause 34: The method of Clause 32, wherein sending the indication to utilize the one or more DMRSs comprises sending the indication to utilize the one or more DMRSs in a group common downlink control information comprising a cyclic redundancy check scrambled with a common radio network temporary identifier for a group of user equipments.

Clause 35: The method of Clause 32, wherein sending the indication to utilize the one or more DMRSs comprises sending the indication to utilize the one or more DMRSs in a user equipment specific downlink control information comprising a cyclic redundancy check scrambled with a cell radio network temporary identifier of a user equipment.

Clause 36: The method of Clause 32, further comprising: sending an indication of one or more common configurations for communication of DMRSs common to the first time interval and the one or more time intervals, the one or more common configurations comprising one or more of: a frequency domain resource allocation; a DMRS configuration type; a precoding resource block group size; a precoder type; or a DMRS scrambling identity.

Clause 37: The method of Clause 32, further comprising: sending an indication of a location of each of the one or more DMRSs from one or more time intervals prior to the first time interval.

Clause 38: The method of Clause 32, wherein receiving the indication of the capability comprises receiving one or more indications of capability information of a user equipment related to construction of virtual pilots, the capability information comprising: a maximum number of the one or more DMRSs the user equipment can store prior to constructing the virtual pilots for the performance of the channel estimation.

Clause 39: The method of any one of Clauses 25-38, further comprising: sending an indication to utilize one or more DMRSs from one or more other resources frequency division multiplexed with the one or more resources to construct one or more virtual pilots based on the one or more data-carrying pilots.

Clause 40: The method of Clause 39, wherein the one or more DMRSs are scheduled for one or more user equipments.

Clause 41: The method of Clause 40, further comprising: sending an indication of a frequency domain resource allocation for each of the one or more user equipments.

Clause 42: The method of Clause 39, wherein sending the indication to utilize the one or more DMRSs comprises sending the indication to utilize the one or more DMRSs in a group common downlink control information comprising a cyclic redundancy check scrambled with a common radio network temporary identifier for a group of user equipments.

Clause 43: The method of Clause 39, wherein sending the indication to utilize the one or more DMRSs comprises sending the indication to utilize the one or more DMRSs in a user equipment specific downlink control information comprising a cyclic redundancy check scrambled with a cell radio network temporary identifier of a user equipment.

Clause 44: The method of Clause 39, further comprising: sending an indication of one or more common configurations for communication of DMRSs common to the one or more resources and the one or more other resources, the one or more common configurations comprising one or more of: a time domain position of the DMRSs; a DMRS configuration type; a precoding resource block group size; a precoder type; or a DMRS scrambling identity.

Clause 45: The method of Clause 39, wherein receiving the indication of the capability comprises receiving one or more indications of capability information of a user equipment related to construction of virtual pilots, the capability information comprising: a maximum number of PRGs the user equipment can store prior to constructing the virtual pilots for the performance of the channel estimation.

Clause 46: The method of any one of Clauses 25-45, further comprising: sending an indication of one or more uplink resources scheduled to carry one or more uplink data-carrying pilots; and receiving, on the one or more uplink resources, the one or more uplink data-carrying pilots.

Clause 47: The method of Clause 46, further comprising: determining a channel estimate based at least in part on the one or more uplink data-carrying pilots.

Clause 48: The method of Clause 47, further comprising: receiving a data signal; and decoding the data signal based on the channel estimate.

Clause 49: One or more apparatuses, comprising: one or more memories comprising executable instructions; and one or more processors configured to execute the executable instructions and cause the one or more apparatuses to perform a method in accordance with any one of Clauses 1-48.

Clause 50: One or more apparatuses, comprising: one or more memories; and one or more processors, coupled to the one or more memories, configured to cause the one or more apparatuses to perform a method in accordance with any one of Clauses 1-48.

Clause 51: One or more apparatuses, comprising: one or more memories; and one or more processors, coupled to the one or more memories, configured to perform a method in accordance with any one of Clauses 1-48.

Clause 52: One or more apparatuses, comprising means for performing a method in accordance with any one of Clauses 1-48.

Clause 53: One or more non-transitory computer-readable media comprising executable instructions that, when executed by one or more processors of one or more apparatuses, cause the one or more apparatuses to perform a method in accordance with any one of Clauses 1-48.

Clause 54: One or more computer program products embodied on one or more computer-readable storage media comprising code for performing a method in accordance with any one of Clauses 1-48.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:

one or more memories; and one or more processors, coupled to the one or more memories, configured to cause the apparatus to:

send an indication of a capability of the apparatus to construct, from data-carrying pilots, virtual pilots for performance of channel estimation;

receive an indication of one or more resources scheduled to carry one or more data-carrying pilots; and receive, on the one or more resources, the one or more data-carrying pilots.

2. The apparatus of claim 1, wherein to send the indication of the capability, the one or more processors are configured to cause the apparatus to send one or more indications of capability information of the apparatus related to construction of virtual pilots, the capability information comprising one or more of:

a Doppler spread threshold;

a delay spread threshold;

a threshold number of resource blocks (RBs);

a maximum number of data-carrying pilots per time period; or support for data-carrying pilots under virtual RB to physical RB interleaving.

3. The apparatus of claim 1, wherein to send the indication of the capability, the one or more processors are configured to cause the apparatus to send one or more indications of capability information of the apparatus related to construction of virtual pilots, the capability information comprising:

a minimum duration after reception of a data-carrying pilot for the apparatus to determine a channel estimate based on the data-carrying pilot.

4. The apparatus of claim 1, wherein to send the indication of the capability, the one or more processors are configured to cause the apparatus to send one or more indications of capability information of the apparatus related to construction of virtual pilots, the capability information comprising:

a maximum duration between scheduling of 1) a demodulation reference signal (DMRS) and 2) a data-carrying pilot.

5. The apparatus of claim 1, wherein to send the indication of the capability, the one or more processors are configured to cause the apparatus to send one or more indications of capability information of the apparatus related to construction of virtual pilots, the capability information comprising:

a category of the apparatus among a plurality of categories associated with a plurality of capabilities for constructing virtual pilots from data-carrying pilots.

6. The apparatus of claim 1, wherein the one or more processors are configured to cause the apparatus to:

receive a transmission comprising a first number of demodulation reference signals (DMRSs);

transmit a negative acknowledgment with respect to the transmission based on a failure to decode the transmission; and receive a retransmission of the transmission, the retransmission comprising a second number of DMRSs, wherein the second number is greater than the first number.

7. The apparatus of claim 1, wherein:

the one or more resources occur during a first time interval; and the one or more processors are configured to cause the apparatus to:

receive an indication to utilize one or more demodulation reference signals (DMRSs) from one or more time intervals prior to the first time interval to construct one or more virtual pilots based on the one or more data-carrying pilots.

8. The apparatus of claim 7, wherein to receive the indication to utilize the one or more DMRSs, the one or more processors are configured to cause the apparatus to:

receive the indication to utilize the one or more DMRSs in a group common downlink control information comprising a cyclic redundancy check scrambled with a common radio network temporary identifier for a group of user equipments including the apparatus.

9. The apparatus of claim 7, wherein to receive the indication to utilize the one or more DMRSs, the one or more processors are configured to cause the apparatus to:

receive the indication to utilize the one or more DMRSs in a user equipment specific downlink control information comprising a cyclic redundancy check scrambled with a cell radio network temporary identifier of the apparatus.

10. The apparatus of claim 7, wherein the one or more processors are configured to cause the apparatus to:

receive an indication of one or more common configurations for communication of DMRSs common to the first time interval and the one or more time intervals, the one or more common configurations comprising one or more of:

a frequency domain resource allocation;

a DMRS configuration type;

a precoding resource block group size;

a precoder type; or a DMRS scrambling identity.

11. The apparatus of claim 7, wherein the one or more processors are configured to cause the apparatus to:

receive an indication of a location of each of the one or more DMRSs from one or more time intervals prior to the first time interval.

12. The apparatus of claim 7, wherein to send the indication of the capability, the one or more processors are configured to cause the apparatus to send one or more indications of capability information of the apparatus related to construction of virtual pilots, the capability information comprising:

a maximum number of the one or more DMRSs the apparatus can store prior to constructing the virtual pilots for the performance of the channel estimation.

13. The apparatus of claim 1, wherein the one or more processors are configured to cause the apparatus to:

receive an indication to utilize one or more demodulation reference signals (DMRSs) from one or more other resources frequency division multiplexed with the one or more resources to construct one or more virtual pilots based on the one or more data-carrying pilots.

14. The apparatus of claim 13, wherein:

the one or more DMRSs are scheduled for one or more user equipments; and the one or more processors are configured to cause the apparatus to:

receive an indication of a frequency domain resource allocation for each of the one or more user equipments.

15. The apparatus of claim 13, wherein to receive the indication to utilize the one or more DMRSs, the one or more processors are configured to cause the apparatus to:

receive the indication to utilize the one or more DMRSs in a group common downlink control information comprising a cyclic redundancy check scrambled with a common radio network temporary identifier for a group of user equipments including the apparatus.

16. The apparatus of claim 13, wherein to receive the indication to utilize the one or more DMRSs, the one or more processors are configured to cause the apparatus to:

receive the indication to utilize the one or more DMRSs in a user equipment specific downlink control information comprising a cyclic redundancy check scrambled with a cell radio network temporary identifier of the apparatus.

17. The apparatus of claim 13, wherein the one or more processors are configured to cause the apparatus to:

receive an indication of one or more common configurations for communication of DMRSs common to the one or more resources and the one or more other resources, the one or more common configurations comprising one or more of:

a time domain position of the DMRSs;

a DMRS configuration type;

a precoding resource block group size;

a precoder type; or a DMRS scrambling identity.

18. The apparatus of claim 13, wherein to send the indication of the capability, the one or more processors are configured to cause the apparatus to send one or more indications of capability information of the apparatus related to construction of virtual pilots, the capability information comprising:

a maximum number of precoding resource block groups (PRGs) the apparatus can store prior to constructing the virtual pilots for the performance of the channel estimation.

19. An apparatus configured for wireless communications, comprising:

one or more memories; and one or more processors, coupled to the one or more memories, configured to cause the apparatus to:

receive an indication of a capability of the apparatus to construct, from data-carrying pilots, virtual pilots for performance of channel estimation;

schedule one or more resources to carry one or more data-carrying pilots;

send an indication of the one or more resources; and send, on the one or more resources, the one or more data-carrying pilots.

20. A method for wireless communications by an apparatus, comprising:

sending an indication of a capability of the apparatus to construct, from data-carrying pilots, virtual pilots for performance of channel estimation;

receiving an indication of one or more resources scheduled to carry one or more data-carrying pilots; and receiving, on the one or more resources, the one or more data-carrying pilots.

* * * * *